(12) United States Patent
Takeda et al.

(10) Patent No.: US 6,512,767 B1
(45) Date of Patent: Jan. 28, 2003

(54) TRANSMISSION MEDIUM CONNECTING DEVICE, CONTROLLING DEVICE, CONTROLLED DEVICE, AND STORAGE MEDIUM

(75) Inventors: Hidetoshi Takeda, Neyagawa (JP); Yasuo Hamamoto, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/130,601

(22) Filed: Aug. 7, 1998

(30) Foreign Application Priority Data

| Aug. 7, 1997 | (JP) | ............................................... 9-212822 |
| Aug. 20, 1997 | (JP) | ............................................... 9-223300 |

(51) Int. Cl.⁷ ............................................. H04L 12/28
(52) U.S. Cl. ...................................... 370/389; 370/241
(58) Field of Search ................................ 370/389, 395, 370/401, 474, 471, 390, 399, 351, 352, 461, 462, 451, 447, 444, 445, 439, 438, 465, 241, 252, 254; 340/825.5, 825.03, 825.51

(56) References Cited

U.S. PATENT DOCUMENTS

| 5,533,025 A | 7/1996 | Fleek et al. |
| 5,537,401 A | 7/1996 | Tadamura et al. |
| 5,568,181 A | 10/1996 | Greenwood et al. |
| 5,602,839 A | 2/1997 | Annapareddy et al. |
| 5,712,976 A | 1/1998 | Falcon, Jr. et al. |
| 5,720,032 A | * 2/1998 | Picazo et al. ................ 370/404 |
| 6,006,275 A | * 12/1999 | Picazo et al. ................ 370/404 |

FOREIGN PATENT DOCUMENTS

| EP | 0 500 987 A1 | 9/1992 |
| EP | 0 508 886 A1 | 10/1992 |
| KR | 90-10567 | 7/1990 |
| KR | 95-22384 | 7/1995 |
| KR | 96-11859 | 4/1996 |
| KR | 96-12762 | 4/1996 |
| KR | 97-31575 | 6/1997 |
| KR | 97-56383 | 7/1997 |
| WO | WO 99/06916 | 2/1999 |

OTHER PUBLICATIONS

Official Action issued from Korean Patent Office dated Nov. 24, 2001.

"Consumer Applications of IEEE 1394 Serial Bus, and A 1394/DV Video Editing System", by Alan T. Wetzel, Michael R Schell International Conference on Consumer Electronics, Chicago, IL, 6/96.

"1394 High Performance Serial Bus: The Digital Interface for ATV", by Adam J. Kunzman, Alan T. Wetzel, Original Publication in the IEEE Transactions on Consumer Electronics, Aug. 1995, vol. 14, No. 13, pp. 893–900., Copyright 1995.

(List continued on next page.)

Primary Examiner—Dang Ton
(74) Attorney, Agent, or Firm—RatnerPrestia

(57) ABSTRACT

A transmission medium connecting device is used for connecting multiple bus type transmission media. The connecting device includes an apparatus information list containing information related to apparatuses connected to the bus type transmission media. The connecting device collects the apparatus information of each of the apparatuses, and prepares the apparatus information list. Also included are a packet receiver for receiving a packet transmitted from the transmission media and a packet transmitter for transmitting a packet to the transmission media. An apparatus connected to the bus type transmission media may request access to the apparatus information list and read out information from the apparatus information list regarding another apparatus to be communicated with.

35 Claims, 9 Drawing Sheets

OTHER PUBLICATIONS

"IEC 61883–1: Consumer Audio/Video Eqiupment—Digital Interface—Part 1: General." Circulated Sep. 26, 1997, pp. 37, 39, 73, 75 and 77, Copyright International Electrotechnical Commission.

"Information Technology—Microprocessor Systems—Control and Status Registers (CSR) Architecture for Microcomputer Buses", ISO/IEC 13213, ANSI/IEEE Std. 1212, First Edition Oct. 5, 1994, International Standard pp. 15–30).

German Office Action dated, Jan. 23, 2001 re: application No. 198 35 668.4–31.

English translation of German Office Action dated Jan. 23, 2001 re: application No. 198–35–668.4–31.

Korean Office Action dated Feb. 1, 2001 re: application No. 10–1998–0032212.

* cited by examiner

TRANSMISSION MEDIUM CONNECTING DEVICE, CONTROLLING DEVICE, CONTROLLED DEVICE, AND STORAGE MEDIUM

BACKGROUND OF THE INVENTION

1. Field of the Invention

The invention relates to a device through which plural bus type transmission media are connected to one another and packets are exchanged, and also to a controlling device and a controlled device which are used under a situation where such plural transmission media are connected to the devices.

2. Related Art of the Invention

At present, as a digital interface which is useful in a digital AV apparatus or a computer peripheral apparatus, known is an IEEE 1394 interface which is an interface standardized by IEEE (I-triple-E) as the generation of a multimedia high-speed serial interface (see IEEE Std 1394-1995 High Performance Serial Bus).

Apparatuses which are to be connected to an IEEE 1394 interface (hereinafter, such an apparatus is referred to as a node) are connected in the form of a tree structure having branches, so that a data output from any node is transmitted to all the other nodes. Although the configuration has a tree structure, therefore, it actually functions as a bus. An identifier which is called a node ID is assigned to each of apparatuses which are connected to a bus in this way. A node ID can have a value in the range from 0 to 62. As a result, 63 apparatuses can be connected to one bus. In view of the tree structure, the connection between two arbitrary apparatuses can be performed by 16 hops at most, and the maximum length of a cable between apparatuses is 4.5 m. In the case where 64 or more apparatuses are to be connected or the connection length is longer than 4.5 m, a bus bridge which assigns IDs to busses and through which the busses are connected to one another can be used. According to this configuration, 1,023 busses can be connected to one another. At present, IEEE proceeds the standardization of such a bus bridge.

By contrast, an IEEE 1394 interface is an interface in which a node can be connected or disconnected during operation. The node IDs are automatically assigned by an operation initializing a bus which is performed when a new node is connected to the bus or conversely when a node is disconnected from the bus (hereinafter, such an operation is referred to as a bus reset). Therefore, a node can be connected or disconnected without requiring the user to set an ID. On the other hand, such a node ID is used as an address for transmission and reception of a packet, and node IDs are changed as a result of a bus reset. When a bus reset once occurs, therefore, the source node must check the node ID of the destination node at the present timing, before a packet is transmitted.

In the bus reset process, each of connected nodes transmits a self ID packet containing information relating to its own functions, in an order which is defined under a certain rule. The self ID packet further contains information indicative of the branching state, that indicative of the ability of the node relating to the bus management, and that relating to the transmission speed to which the node corresponds. In IEEE 1394, three transmission speeds, i.e., 100 Mbps, 200 Mbps, and 400 Mbps are defined. It is guaranteed that all nodes correspond to the transmission speed of 100 Mbps. When two nodes which perform transmission and reception of a packet and all relay nodes between the two nodes correspond to speeds of 200 Mbps and higher, the packet transmission can be performed by using a transmission speed of 200 Mbps or higher. According to information contained in the self ID packet, it is possible to judge whether a transmission speed of 200 Mbps or higher can be used or not. When the self ID packet is received, it is possible to know the number of nodes connected to the bud, the connection state of the bus, etc. Therefore, information such as a delay time for propagation which depends on the connection state of the bus can be known.

IEEE 1394 defines two kinds of packets. One of the packets is used for transmitting a data which must be processed in real time, such as video and audio, and called an isochronous packet. The other packet is used for transmitting a usual data which is not required to be processed in real time, and called an asynchronous packet. An isochronous packet is guaranteed to be transmitted in a reserved bandwidth, but cannot be subjected to processes such as retransmission. On occasions when such a process is necessary, an error correction process is performed. In advance of transmission, as described above, a bandwidth to be used must be reserved. By contrast, with respect to an asynchronous packet, processes such as retransmission can be performed, but the time period for transmission of the packet is not guaranteed because retransmission may be performed.

Among the two kinds of packets, an asynchronous packet undergoes transmission and reception processes as an access to a CSR (Control and Status Register) address space which is defined in ISO/IEC 13213 (Control and Status Register Architecture for Microcomputer Buses) and IEEE 1394 and which the corresponding node has. In other words, in IEEE 1394, all nodes connected to a bus have a virtual 48-bits address space and communication between nodes is realized as a writing or reading operation on the respective address space. In an asynchronous packet, therefore, a packet for performing a writing or reading operation on an address space is defined.

When a data which is not required to be processed in real time is to be transmitted from a node, the node transmits a packet for writing the data into the destination address space. The reception side judges the kind and type of the data from the written address, and returns a response indicating whether the reception has been normally performed as a result of the writing operation or not (a write request and a write response). By contrast, when a node requests a data, a request for reading out the address of the request destination is transmitted. In this case, the node which receives the data request judges the kind and contents of the requested data, from the address of the read request, and then transmits an appropriate data as a response to the reading operation (a read request and a read response). In this way, the data transfer is realized by writing a data into an address space, a read request, and a response to the request. FIGS. 1 and 2 show such an asynchronous packet. The portions of the same contents are designated by the same reference numeral.

FIG. 1(*a*) shows a packet for performing a write request, and FIG. 1(*b*) shows a packet for performing a response to the write request. FIG. 2(*a*) shows a packet a packet for performing a read request, and FIG. 2(*b*) shows a packet for performing a response to the read request. The write request, the read request, and the responses to the requests are distinguished from one another by a kind 106.

The write request is transmitted with using a packet of a write request packet 101, and writing the node ID of the destination to which the write request is to be transmitted into a destination ID 103, the ID of the node which performs the write request into a source ID 108, the leading address into which the data is to be written, into a write leading address 109, the size of the data to be written, into a write size 110, and the data to be transmitted into a data to be written 111. A label 104 is used by the transmission node in order to associate the request with the response, an rt 105 indicates whether retransmission is to be performed or not, and a pri 107 indicate the priority of the packet.

In the response to the write request, a write response packet 102 is used, and it is indicated whether the data has been normally received or not, by using a result 112. A label 104 of the packet for the response uses the same value as the packet for the request. According to this configuration, it is possible to associate the request with the response.

By contrast, the read request is transmitted with using a packet of a read request packet 201, and writing the node ID of the destination to which the read request is to be transmitted into a destination ID 103, the ID of the node which performs the read request into a source ID 108, the leading address from which the data is to be read out and which is previously known, into a read leading address 109, and the size of the data to be read into a reading size 110.

The response to the read request is transmitted with using a read response packet 202, indicating whether the data has been normally received or not, by using a result 112, and writing the size of the data which has been actually read out, into a read size 204, and the read-out data into a read-out data 205.

In IEEE 1394, a part of the CSR address space has a 64-bit number specific to a node which can uniquely identify the function and ability of the node and the node itself, at an address which is determined so as to be common to all nodes. This address is called a configuration ROM. A node connected to IEEE 1394 can detect a change in the node ID before and after a bus reset, by using the number which is specific to a node and which is contained in the configuration ROM.

A digital AV apparatus having an IEEE 1394 interface transmits and receives information relating to the control, and the like, by using such an asynchronous packet. The method of transmitting and receiving such control information is defined in IEC 61883. In the method defined in the standard, a command for controlling an apparatus is transmitted as a write request to a specific address of a CSR address space. By contrast, also a response to the request is transmitted as a write request to a specific address. The address of the controlled side for writing a command for a control is different from that of the controlling side for writing a result of the operation of the apparatus.

By contrast, when an isochronous packet for transmitting a data which must be processed in real time is to be used, as described above, it is required to perform an operation of reserving a bandwidth to be used, on the bandwidth management node. The bandwidth management node is uniquely determined from information contained in the self ID packet which is transmitted in the case of a bus reset. When an isochronous packet is to be transmitted, a bus use time per unit time which depends on the size of the packet and the propagation delay calculated from the connection state of the bus is reserved in advance of transmission. As described above, the propagation delay can be determined by analyzing the self ID packet.

As a method of transmitting and receiving information and data for controlling a hard disk drive, a CD-ROM, or the like by using IEEE 1394, known is Serial Bus Protocol 2 (hereinafter, referred to as SBP2). ANSI proceeds the standardization of SBP2. In SBP2, control information defined in SCSI (Small Computer System Interface) and data are transferred and received by using an IEEE 1394 interface. Therefore, apparatuses which are conventionally connected to a computer by using SCSI, such as hard disk drive and a CD-ROM can be connected to a computer by using an IEEE 1394 interface.

In SBP2, it is specified that, in advance of control of an apparatus, a procedure for causing a controlling device to exclusively use a controlled device is performed. As a result of this procedure, the controlled device executes only a control request from the device which is allowed to exclusively use the controlled device, and denies a control request from any other device. By contrast, in an IEEE 1394 interface, an apparatus can be connected or disconnected during operation, and hence there are possibilities that a controlling device which has exclusively used a controlled device is disconnected from the interface, and that a bus reset which is performed as a result of this disconnection causes the node ID of the controlling device performing the exclusive use to be changed. To comply with this, in SBP2, an exclusive use is once canceled when a bus reset is detected. In a controlling device, when a bus reset is detected, a procedure for an exclusive use is again performed after the bus reset is ended.

In the same manner, also in the method of transmitting and receiving control information in a digital AV apparatus defined in IEC 61883, a controlled device can be exclusively used. In this case also, when a bus reset is detected, both controlling and controlled devices perform an operation of canceling the exclusive use, and then a procedure of setting an exclusive use is again performed.

In the above-described example of SBP2, when a control which requires an exclusive use is performed, it is necessary to detect a change of the connection state of a transmission medium and cancel or reset the exclusive use.

In a system wherein plural transmission media (busses) are connected to one another by means of an apparatus for connecting busses such as a bus bridge, however, a bus reset which occurs in another transmission medium cannot be detected because connection and disconnection of an apparatus occur in each of the transmission media. In the case where a controlling device and a controlled device are connected to different transmission media and apparatuses are controlled via a bus bridge, even when the controlling device is disconnected, therefore, the controlled device cannot detect the disconnection and cancel the exclusive use state. Consequently, there is a problem in that, when the controlling device is disconnected, the controlled device is left to be in the exclusive use state and any controlling device cannot thereafter use the controlled device.

Furthermore, also the controlling device cannot detect a bus reset in the other transmission medium to which the controlled device is connected. Therefore, there arises a problem in that the controlling device cannot temporarily cancel the exclusive use state and again perform the procedure of setting the exclusive use, and a further control is disabled.

In a system wherein plural sets of such IEEE 1394 interfaces are connected to one another, the interfaces must mutually inquire about information relating abilities of nodes. Particularly when a bus reset occurs, even if the bus reset is detected, plural nodes concentrically transmit the same inquiry to a node which is connected to the bus wherein the bus reset occurs, thereby producing a problem in that these inquiries may disturb a usual data transfer. Moreover, only a node which is connected to the bus wherein the bus reset occurs can receive a self ID packet which is transmitted as a result of the bus reset. Therefore, there is a further problem in that the other nodes which are connected via the bus bridge cannot know information such as the correspondence transmission speed of the node, the degree of the propagation delay which depends on the connection state of the bus, and the node ID of the bandwidth management node.

As described above, in the prior art, a method which can sufficiently cope with connection of plural transmission media has not yet been established, and there are problems in that various kinds of inquires and collection of information cannot be performed, and that other communication may be disturbed.

On the other hand, in a prior art bus bridge through which plural transmission media are connected to one another, in order to transfer a packet received from one transmission medium to another one, it is required to receive all packets on the transmission media and judge whether the received packets are to be transferred to other transmission media or not. In the case of IEEE 1394, for example, a packet can be transmitted by using the ID of a bus to another bus which is connected beyond a bus bridge. In this case, however, all packets transmitted to the bus must be received and the received packets must be subjected to judgement on whether they should be transmitted or not. In the reception of all packets, it is impossible to use a packet transmitting and receiving circuit which is used in a usual apparatus. In order to judge whether a packet is to be transferred or not, moreover, a sophisticated process must be performed at a high speed. In this way, a connection of transmission media has a problem in that a special circuit and a sophisticated process are required.

In IEEE 1394, for example, the node ID is changed when a bus reset occurs. Consequently, IEEE 1394 has a problem in that, each time when a bus reset occurs, the node ID of the node which transmits a packet must be checked, thereby complicating a process relating to the packet transmission. In this way, when a data is transmitted with connecting plural transmission media wherein identifiers of connected apparatuses are changed, there is a problem in that an operation of checking the destination of the data is complicated.

On the other hand, for example, IEEE 1394 functions as a bus. At a moment when a node transmits a data, therefore, another node cannot use the bus. Therefore, the time required for transmission in the case where 200 Mbps is used as the transmission speed is shorter than that in the case where 100 Mbps is used, and hence a bus can be efficiently used in the former case. In the case where a packet is to be transmitted beyond a bus bridge, even when a transmission speed higher than 100 Mbps can be used in one bus, a transmission speed higher than 100 Mbps cannot be used as described above unless all relay nodes between the node and the destination node in another bus correspond to the transmission speed. Therefore, there arises a problem in that busses cannot be efficiently used. In this way, when a data is transmitted with connecting plural transmission media which can use multiple transmission speeds, there is a problem in that available data transmission speeds are restricted by the ability of a relay apparatus and the transmission media cannot be efficiently used.

In IEEE 1394, for example, when a node which is the destination of a packet fails to correspond to the connection of plural busses using a bus bridge, a communication via a bus bridge cannot be performed and hence data transfer is disabled. In this way, in the case where a data is transmitted with connecting plural transmission media, when an apparatus which is the destination of a packet can perform packet transmission with only nodes connected to the transmission medium to which the apparatus itself is connected, there is a problem in that a data cannot be transmitted between the apparatus and an apparatus connected to another transmission medium.

As described above, a prior art device has a problem in that, in an environment where plural busses are connected to one another, it cannot normally operate.

SUMMARY OF THE INVENTION

In view of the above-discussed problems of a prior art device, it is an object of the invention to provide a transmission medium connecting device, a controlling device, a controlled device, and a storage medium which allow plural transmission media such as IEEE 1394 to be connected to one another and enable data transmission and control among the transmission media.

A transmission medium connecting device of the present invention through which plural bus type transmission media are connected to one another, wherein said device comprises:

an apparatus information list containing apparatus information relating to apparatuses connected to said bus type transmission media;

apparatus information collecting means for collecting the apparatus information of each of apparatuses, and for preparing said apparatus information list;

packet receiving means for receiving a packet transmitted from said transmission media;

information outputting means for receiving a request for an access to apparatus information contained in said apparatus information list, and for reading out requested information from said apparatus information list and outputting the information; and packet transmitting means for transmitting a packet to said transmission media.

A transmission medium connecting device of the present invention through which plural bus type transmission media are connected to one another, wherein said device comprises:

a transmission medium information list containing a parameter indicating a connection configuration of each of said bus type transmission media connected to said transmission medium connecting device;

transmission medium information preparing means for preparing said transmission medium information list in accordance with acquired connection configurations of said bus type transmission media;

packet receiving means for receiving a packet transmitted from said transmission media;

information outputting means for receiving a request for an access to transmission medium information contained in said transmission medium information list, and for reading out requested information from said transmission medium information list and outputting the information; and packet transmitting means for transmitting a packet to said transmission media.

A transmission medium connecting device of the present invention through which plural bus type transmission media in which an apparatus identifier applied to a connected apparatus is changed are connected to one another and packets are exchanged, wherein said device comprises:

virtual identifier applying means for applying a virtual identifier to each of apparatuses, said virtual identifier being able to identify all apparatuses connected to said bus type transmission media;

a virtual identifier correspondence table which holds correspondence between said virtual identifiers of said apparatuses and said apparatus identifiers;

packet transmitting means for transmitting a packet to said bus type transmission media; and packet receiving means for receiving a packet from said bus type transmission media, when said packet receiving means receives a transfer packet in which said virtual identifier is used as a destination parameter and which requests a transfer to another apparatus, said transmission medium connecting device converts said destination parameter into said apparatus identifier of a destination at this timing, on the basis of said virtual identifier correspondence table, and said packet transmitting means transmits contents of said transfer packet to an apparatus indicated by said destination parameter, with using said apparatus identifier.

A transmission medium connecting device of the present invention through which plural bus type transmission media are connected to one another and packets are exchanged, wherein said device comprises:

packet receiving means for receiving a packet; and packet transferring means (307) for, when a reception packet received by said packet receiving means satisfies predesignated conditions, transferring said reception packet to a predesignated apparatus.

A transmission medium connecting device of the present invention through which plural bus type transmission media in which an apparatus can be connected or disconnected during operation and which, when a connection state is changed, are initialized are connected to one another, wherein said device comprises:

transmission medium monitoring means (602) for monitoring a state of each of said transmission media connected to said transmission medium connecting device, and for detecting initialization of said transmission media;

first request accepting means (603) for accepting designation information relating to a monitored transmission medium (607) which is to be monitored with respect to initialization, and a connection state notification destination device (610) to which notification of occurrence of initialization of said monitored transmission medium, from a first requesting device (610) which is connected to one of said transmission media connected to said transmission medium connecting device; and connection state notifying means (604) for, when said transmission medium monitoring means detects initialization of a transmission medium which is a monitoring object, notifying the detection to said connection state notification destination device.

A transmission medium connecting device of the present invention through which plural bus type transmission media in which an apparatus can be connected or disconnected during operation and which, when a connection state is changed, are initialized are connected to one another, wherein said device comprises:

transmission medium monitoring means (602) for monitoring a state of each of said transmission media connected to said transmission medium connecting device, and for detecting initialization of said transmission media;

second request accepting means (703) for accepting designation of a monitored transmission medium (607) which is to be monitored with respect to initialization, and an initialized transmission medium (609) which is to be interlockingly initialized, from a second requesting device (705) which is connected to one of said transmission media connected to said transmission medium connecting device; and first initializing means (702) for, when said transmission medium monitoring means (602) detects initialization of said monitored transmission medium (607), initializing said initialized transmission medium (609) in a manner interlocked with the initialization.

A transmission medium connecting device of the present invention through which plural bus type transmission media in which an apparatus can be connected or disconnected during operation and which, when a connection state is changed, are initialized are connected to one another, wherein said device comprises:

third request accepting means (803) for accepting designation of a monitored device (805) which is connected to one of said transmission media connected to said transmission medium connecting device, and which to be monitored with respect to an operation state, and an operation state notification destination device (804) to which a non-operation state of said monitored device is notified, from a third requesting device (805) which is connected to one of said transmission media connected to said transmission medium connecting device; and operation state notifying means for monitoring the operation state of said monitored device, and for, when it is detected that said monitored device is not operating, notifying a non-operation state to said operation state notification destination device.

A transmission medium connecting device of the present invention through which plural bus type transmission media in which an apparatus can be connected or disconnected during operation and which, when a connection state is changed, are initialized are connected to one another, wherein said device comprises:

fourth request accepting means for accepting designation of a monitored device (905) which is to be monitored with respect to an operation state, and an initialized transmission medium (609) which is to be initialized, from a fourth requesting device (905) which is connected to one of said transmission media connected to said transmission medium connecting device; and second initializing means (902) for monitoring the operation state of said monitored device, and for, when it is detected that said monitored device (905) is not operating, initializing said initialized transmission medium (609).

A controlled device of the present invention which is connected to a transmission medium in which an apparatus can be connected or disconnected during operation and which, when a connection state is changed, is initialized, wherein said controlled device operates with receiving an operation request from a controlling device connected to a second transmission medium, said controlled device being indirectly connected to said second transmission medium via a transmission medium connecting device connected to a first transmission medium to which said controlled device is directly connected, said controlled device comprises:

notification receiving means for receiving at least one of a notification indicating that initialization occurs in said second transmission medium, and a notification indicating that said controlling device is not operating; and operation managing means for managing an operation of said controlled device, and for, when said notification receiving means receives one of the notifications, canceling a part of or all of the operation request, and said controlled device operates with receiving the operation request from said controlling device.

A controlling device of the present invention which is connected to a transmission medium in which an apparatus can be connected or disconnected during operation and which, when a connection state is changed, is initialized, wherein said controlling device transmits an operation request to a controlled device, said controlled device being indirectly connected to a first transmission medium via a transmission medium connecting device connected to a second transmission medium to which said controlling device is directly connected, and said controlling device comprises:

notification receiving means for receiving at least one of a notification indicating that initialization occurs in said first transmission medium, and a notification indicating that said controlled device is not operating; and operation request managing means for generating and transmitting the operation request to said controlled device, for, when said notification receiving means receives one of the notifications, checking an operation state of said controlled device, and for, when said controlled device is operating, again transmitting an operation request which has not yet been completed.

PREFERRED EMBODIMENTS

Hereinafter, embodiments of the invention will be described with reference to the accompanying figures.

(First embodiment)

Figure 3:
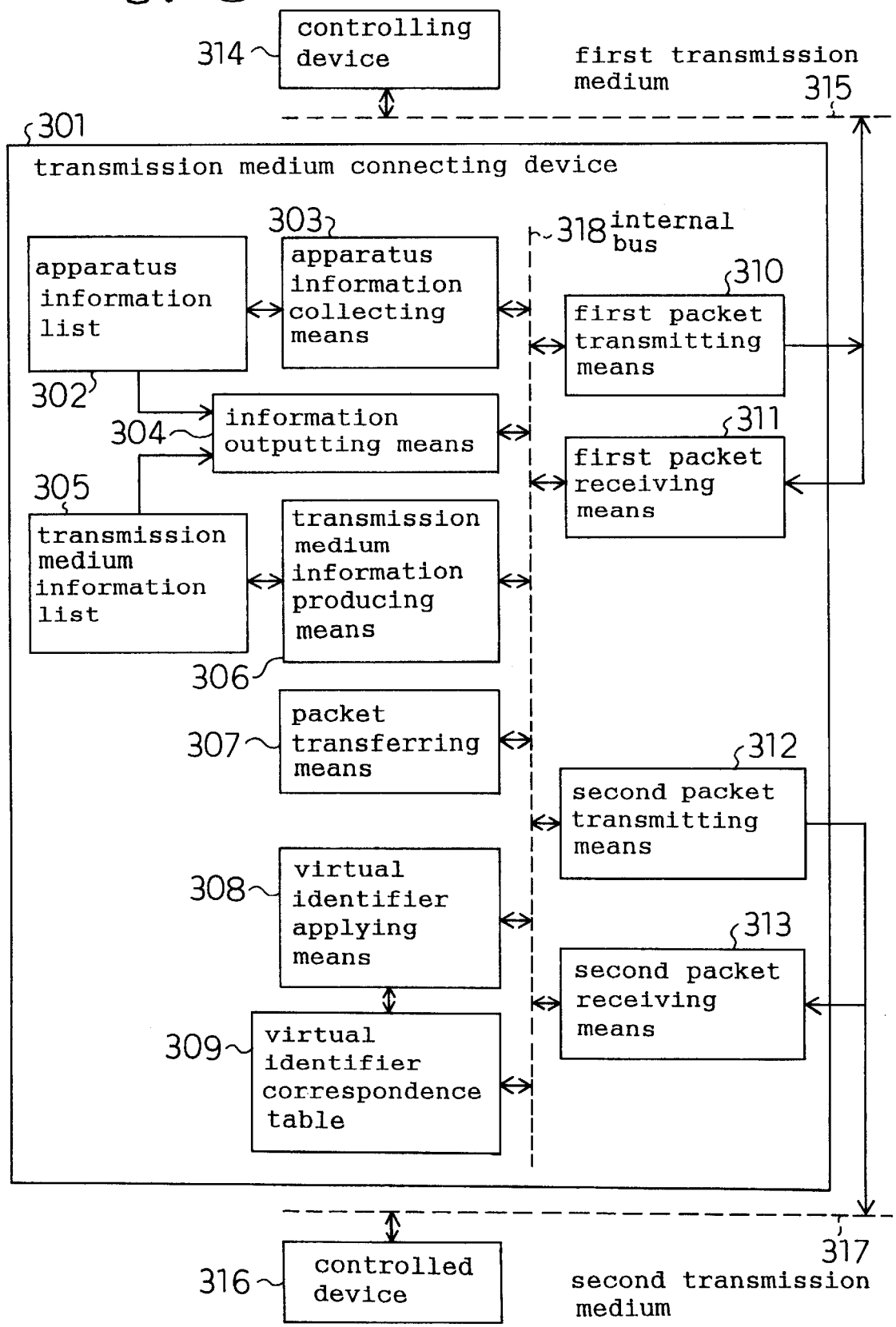
FIG. 3 is a schematic block diagram showing main portions of a transmission medium connecting device in a first embodiment of the invention.

FIG. 3 is a block diagram showing the main configuration of a transmission medium connecting device, a controlling device, and a controlled device of the embodiment.

A transmission medium connecting device 301 through which first and second transmission media 315 and 317 are connected to each other comprises: first packet transmitting means 310 and first packet receiving means 311 which are connected to the first transmission medium 315; second packet transmitting means 312 and second packet receiving means 313 which are connected to the second transmission medium 317; apparatus information collecting means 303; an apparatus information list 302; information outputting means 304; transmission medium information producing means 306; a transmission medium information list 305; packet transferring means 307; virtual identifier applying means 308; and a virtual identifier correspondence table 309. These means are connected to one another by an internal bus 318.

In the embodiment, an IEEE 1394 interface incorporated herein by reference is used as each of the first and second transmission media 315 and 317. Hereinafter, the case where a controlling device 314 connected to the first transmission medium 315 transmits and receives a packet for controlling a controlled device 316 connected to the second transmission medium 317 will be described. The controlling device 314 is a device which can control another apparatus in accordance with instructions of the user, such as a controller of an AV apparatus, or a personal computer. The controlled device 316 is a device which receives a control request from another device and operates in accordance with the request, such as a digital VCR.

When initialization of a transmission medium (hereinafter, referred to as a bus reset) is detected in one of IEEE 1394 busses which are connected as the first and second transmission media 315 and 317, the transmission medium connecting device 301 updates the apparatus information list 302, the transmission medium information list 305, and the virtual identifier correspondence table 309.

When a bus reset occurs in one of the transmission media, the apparatus information collecting means 303 receives self ID packets transmitted from the nodes-connected to the transmission medium and analyzes the packets. From the analysis of the self ID packets, it is possible to know various kinds of information such as whether the respective nodes are in the state where the packet transmission and reception are enabled or not, the corresponding transmission speed, and the maximum transmission speed of the path between the respective nodes and the transmission medium connecting device 301. When the contents of the configuration ROM of each node are read out, it is possible to know other kinds of information such as the number specific to the node, the size of the maximum reception packet, and the presence or absence of the bus management ability. The apparatus information collecting means 303 prepares the apparatus information list 302, on the basis of such information.

When a bus reset occurs, the transmission medium information producing means 306 receives the self ID packets, calculates a parameter for indicating the degree of the propagation delay, in accordance with the number of nodes connected to the bus and the maximum allowable number of connected nodes, and prepares the transmission medium information list 305.

When the bus reset is detected, the virtual identifier applying means 308 checks the number of nodes in accordance with the self ID packets, and reads out the contents of the configuration ROMs of all the nodes. Each configuration ROM contains the number specific to the corresponding node. All the nodes have such a specific number. The virtual identifier applying means 308 writes an assigned virtual identifier, the actual node ID, and the specific number into the virtual identifier correspondence table 309. In the case where the bus reset is a second or later one and the virtual identifier, the node ID, and the specific number are already written, the contents of the configuration ROM are read out, and only the node ID corresponding to the number specific to the node is written. According to this configuration, the same node can be always indicated by using the same virtual identifier.

During the determination of the virtual identifier, a predetermined virtual identifier can be assigned to a node which has a specified function. For example, a predetermined virtual identifier may be assigned to a node which manages the bandwidth of each bus, thereby facilitating the designation of the bandwidth management node. At this time, plural virtual identifiers may be assigned to the identical node. Specifically, one node may be assigned with plural virtual identifiers such as a virtual identifier corresponding to the above-mentioned number specific to the node, and a virtual identifier depending on the function of the node. A specified virtual identifier may be used as a special identifier indicative of plural nodes. For example, a virtual identifier may be used for indicating, for example, all nodes connected to one bus, or all nodes of all busses. This allows simultaneous packet transmission to plural nodes to be designated.

Figure 4:
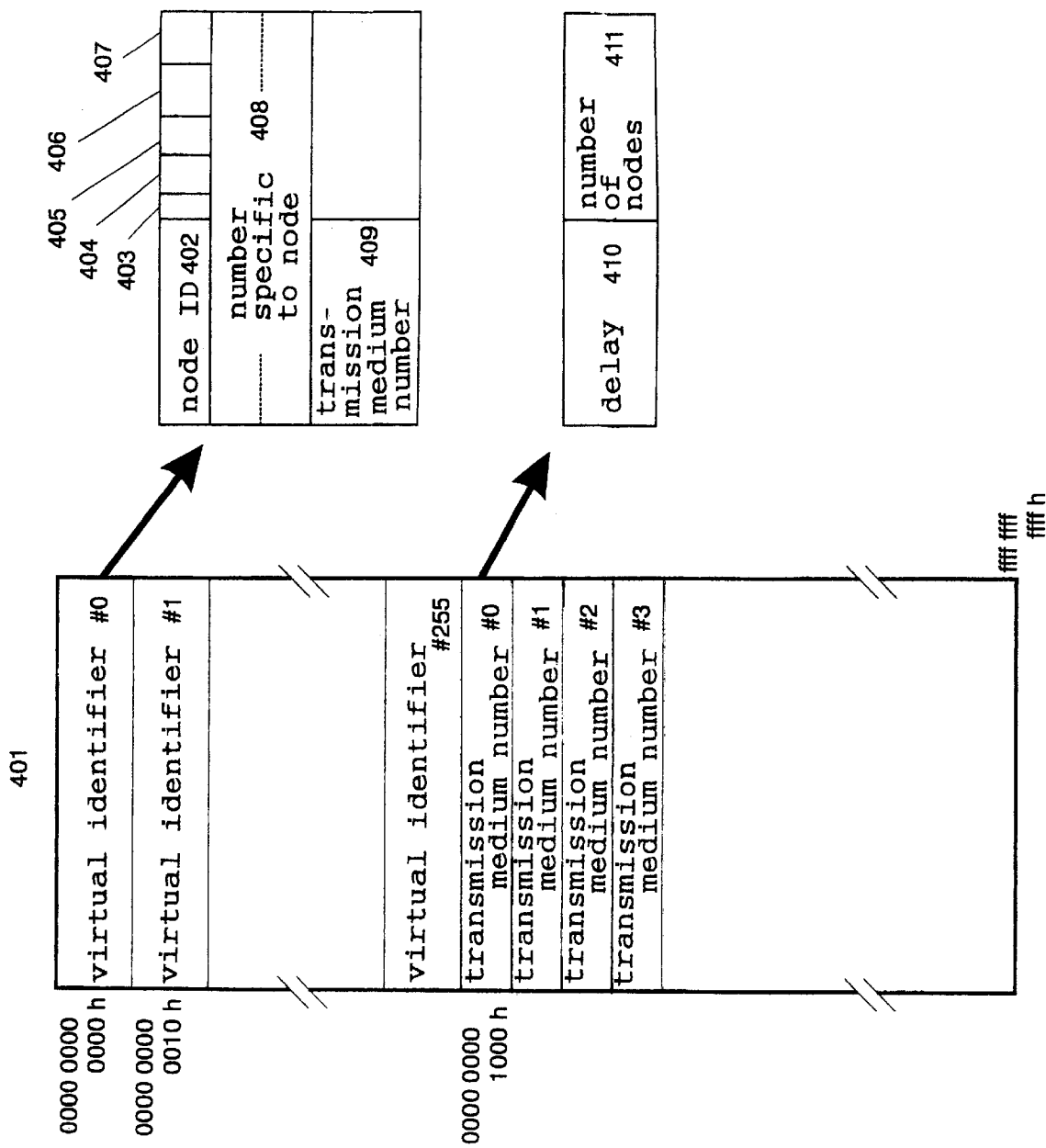
FIG. 4 is a diagram showing an example of an apparatus information list and a transmission medium information list in the first embodiment of the invention.

The contents of the apparatus information list 302 and the transmission medium information list 305 are placed at predetermined addresses of a CSR address space. In response to a read request to one of the addresses, the information outputting means 304 outputs the contents of the address. Furthermore, the correspondence relationships between the addresses of information of each node in the apparatus information list 302 and the virtual identifiers may be previously determined so that the apparatus information list 302 and the virtual identifier correspondence table 309 are realized by one table. FIG. 4 shows an example in which the apparatus information list 302 and the virtual identifier correspondence table 309 are realized by one table as described above, and the table is disposed together with the transmission medium information list 305 in the CSR address space.

In the example shown in FIG. 4, nodes connected to each transmission medium response the contents of the apparatus information list 302, as a result of reading of an address between 000000000000 and 000000000fff. Address 000000000000 correspond to virtual identifier 0, and succeeding address 000000000010 to virtual identifier 1. By contrast, a node responses the contents of the transmission medium information list 305, as a result of reading of address 000000001000 and subsequent.

For each node, the apparatus information list 302 disposed in a CSR address space 401 shown in FIG. 4 contains: a node ID 402; a state 403 indicating whether packet transmission and reception are enabled at the questioned timing or not; a transmission speed 404 to which the node corresponds; a maximum transfer rate 404 showing the maximum rate at which packet transmission and reception are enabled between the node and the transmission medium connecting device 301; a maximum size 406 indicating the size of the maximum reception packet for the node; a management function 407 indicating the presence or absence of the bus management function; a 64-bit number 408 specific to the node; a transmission medium number 409 indicating the number of the connected bus; and the like. On the other hand, the transmission medium information list 305 contains a delay 410 indicting the propagation delay of a bus, and the number 411 of nodes connected to the bus.

Each time when a bus reset occurs, the apparatus information collecting means 303, the transmission medium information producing means 306, and the virtual identifier applying means 308 update the contents of the above-mentioned CSR address space by means of reception and analysis of the self ID packet and reading of the configuration ROM.

Next, the operation of transferring a packet received by the controlling device 314 to the controlled device 316 will be described.

Figure 5:
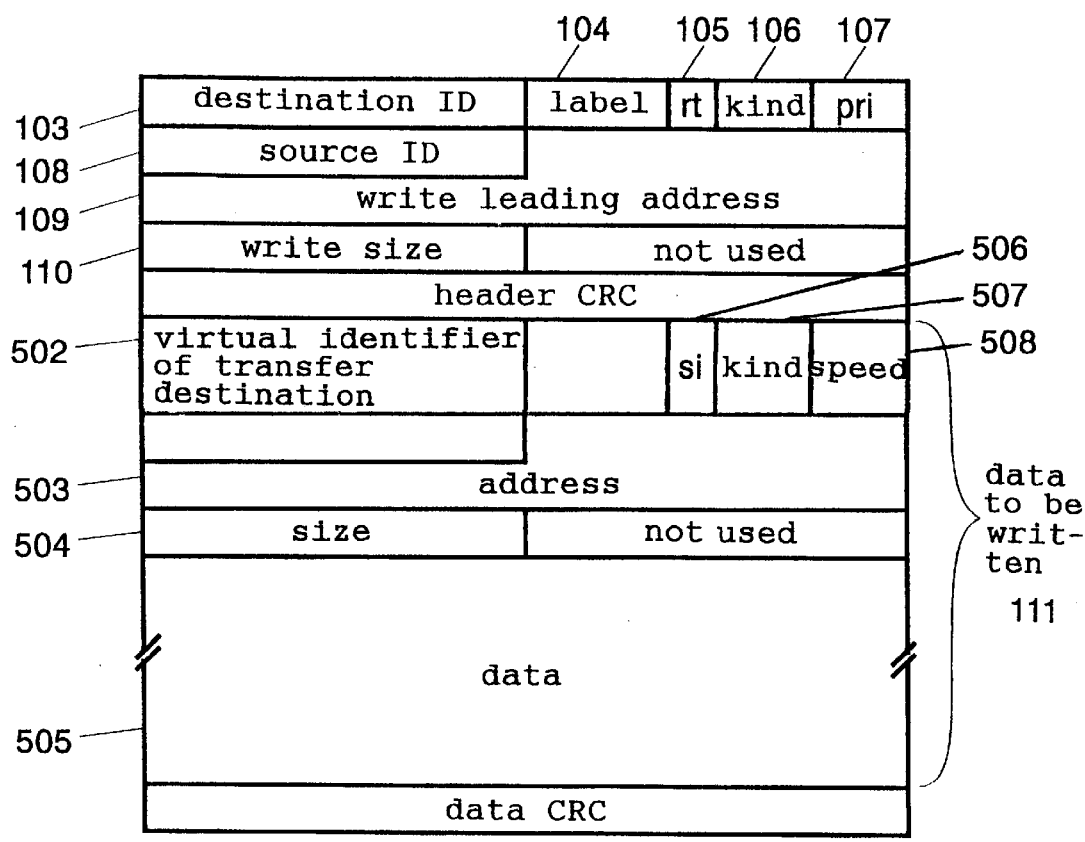
FIG. 5 is a diagram showing the configuration of a packet for transfer in the first embodiment of the invention.

When the controlling device 314 connected to the first transmission medium 315 is to transmit a packet for performing a control to the controlled device connected to the second transmission medium 317, the controlling device 314 first reads out the CSR address space 401 which is the apparatus information list 302 of the transmission medium connecting device 301, to read information such as whether the nodes are operating or not, the corresponding speed, and the size of the maximum reception packet, and writes a packet shown in FIG. 5 into the CSR address for a transfer packet of the transmission medium connecting device 301 with using, as a parameter, a virtual identifier which is determined in accordance with the address where the apparatus information is written.

Figure 1A:
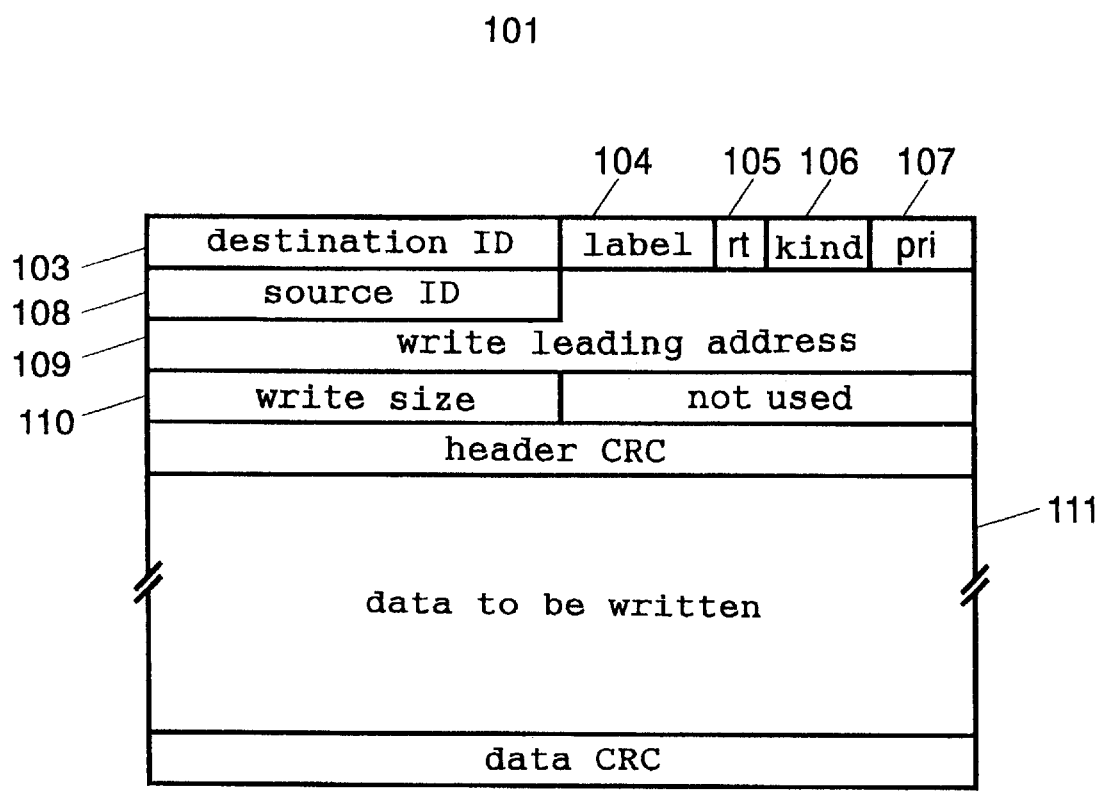
FIG. 1(A) is a diagram showing the configuration of a write request packet in IEEE 1394.

In the transfer packet 501 shown in FIG. 5, the packet which is to be transmitted to the destination (the controlled device) of the actual packet is included into the data portion 111 of the write request packet shown in FIG. 1. A virtual identifier corresponding to the controlled device 316 which is the transfer destination is written into the virtual identifier 502 of the transfer destination. Either of the write leading address 109 of the packet to be transferred or the read leading address 203 is written into an address 503. The size of the packet to be transferred is written into a size 504. A parameter indicating the manner of disposing the ID of the source of the transfer packet which will be described later is written into an si 506. The kind of the packet to be transferred is written into a kind 507. The transmission speed of transfer is written into a speed 508. The data which are to be transmitted are written in a data 505. The address 503, the size 504, the kind 507, and the data 505 contain a value which can be used as it is in the packet to be transferred by the transmission medium connecting device 301.

When the first packet receiving means 311 of the transmission medium connecting device 301 receives the transfer packet shown in FIG. 5 from the controlling device 314, the virtual identifier 502 of the transfer destination is replaced with the node ID corresponding to the virtual identifier of the transfer destination, by using the virtual identifier correspondence table 309. In the case where the controlled device 316 is designated as the virtual identifier 502 of the transfer destination, for example, when the second packet transmitting means 312 performs transmission on the controlled device 316, the node ID of the controlled device 316 is used as the destination ID 103 of the packet of FIG. 1 or 2. The second packet transmitting means 312 enters an appropriate value into the label 104, the rt 105, and the pri 107 of the packet to be transmitted, and performs transmission at a speed which is designated by the speed 508 of the transfer packet 501. In this case, also an addition of a necessary CRC to the header and data portions of the packet is performed.

In this case, when it is designated by the si 506 to use the node ID of the transmission medium connecting device 301 as the source ID 108 of the packet to be transferred, the second packet transmitting means 312 performs packet transmission while using the node ID of the transmission medium connecting device 301 in the second transmission medium 317, as the ID of the transmission source. By contrast, when it is designated by the si 506 to use the virtual identifier of the controlling device 314 which actually transmits the packet as the source ID of the packet to be transferred, the virtual identifier of the controlling device 314 is checked by using the virtual identifier correspondence table 309, and the packet transmission is performed while using the virtual identifier as the ID of the transmission source.

When the packet is to be transferred, the transfer may not be performed at a specific speed, and the value indicating that transmission is to be performed at the maximum speed between the transmission medium connecting device 301 and the destination of the packet may be used as the speed 508. In this case, the second packet transmitting means 312 obtains the maximum transmission speed between the transmission medium connecting device 301 and the controlled device 316, on the basis of the apparatus information list 302, and then transmits the packet with using the speed.

Figure 1B:
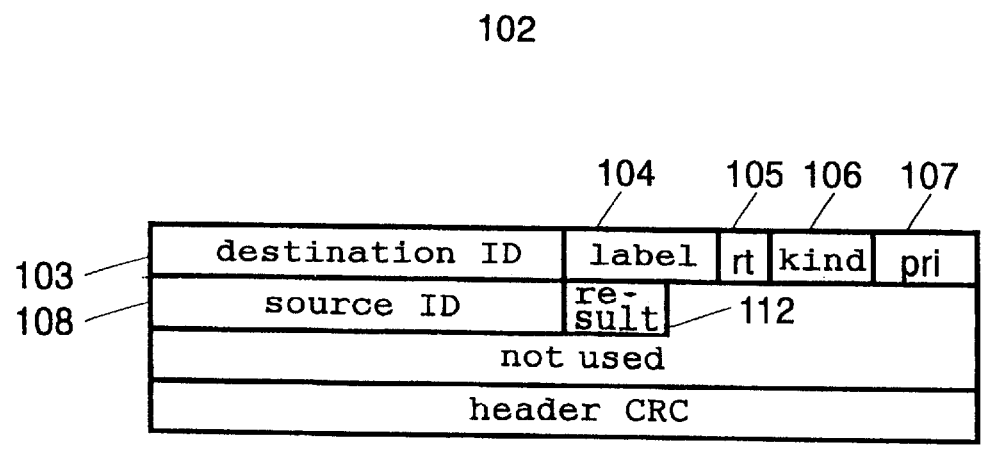
FIG. 1(B) is a diagram showing the configuration of a write response packet in IEEE 1394.
Figure 2A:
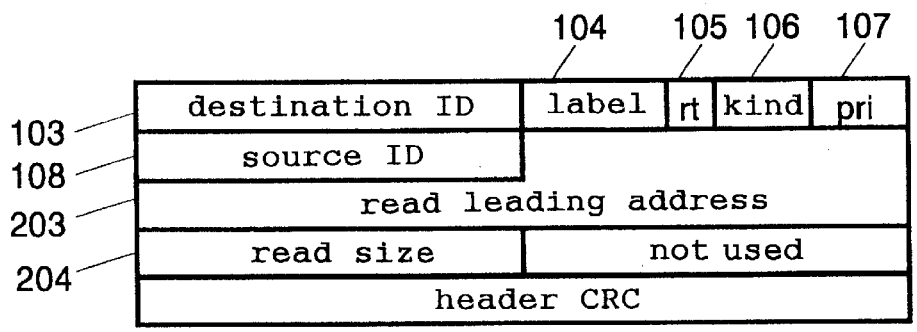
FIG. 2(A) is a diagram showing the configuration of a read request packet in IEEE 1394.
Figure 2B:
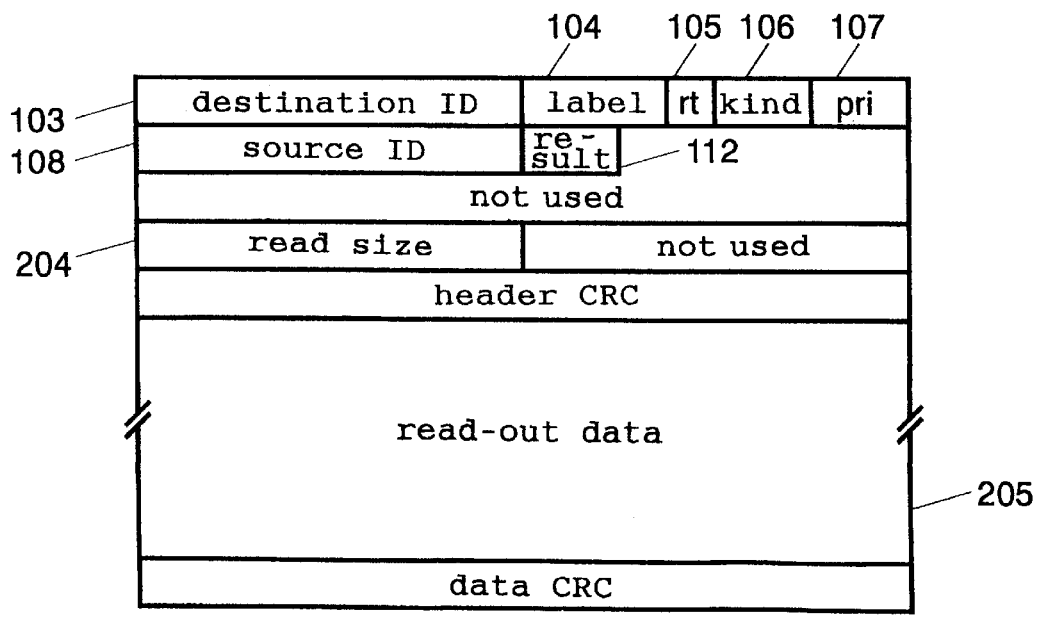
FIG. 2(B) is a diagram showing the configuration of a read response packet in IEEE 1394.

When the packet which is transferred in this way is a packet which issues a write or read request and the node ID of the transmission medium connecting device 301 is used as the ID of the transmission source, the controlled device 316 processes the received write or read request, and transmits the write response packet 102 shown in FIG. 1(b) or the read response packet 202 shown in FIG. 2(b) to the transmission medium connecting device 301. By contrast, the transmission medium connecting device 301 previously stores the destination ID 103, the label 104, the kind 106 of the packet which is transferred to the controlled device 316, and, when a packet which can be judged to be a response to the transmitted request is received from the controlled device, transfers the packet to the controlling device 314. In the case where the transmission medium connecting device 301 transfers a write request packet from the controlling device 314 to the controlled device 316 with setting the label to be 1, for example, when a packet which is a write request packet and which has a label of 1 is received from the controlled device 316, the packet is judged to be a response of the transferred packet, and the packet is transferred to the controlling device 314.

In this way, the controlling device 314 transmits a packet for requesting to the controlled device 316, and a packet containing a response to the request is transmitted to the controlling device 314. In this case, the controlling device 314 which performs the request must know that the transmission medium connecting device 301 connects the first transmission medium 315 and the second transmission medium 317, and transmit the packet shown in FIG. 5. However, the controlled device 316 is not required to know the operation of the transmission medium connecting device 301, and can transmit a packet containing a response to the controlling device 314 by the same operation as that in the case where it receives a packet containing a request from a node connected to the same bus and transmits a packet containing a response to the node.

In the case where also the controlled device 316 can recognize the presence of the transmission medium connecting device 301 and transmit the transfer packet shown in FIG. 5, the controlling device 314 designates by the si 506 to use the virtual identifier of the controlling device 314 as the ID of the source of the packet to be transferred. The controlled device 316 which receives the packet transmits a response to writing or reading, as a write request to the transmission medium connecting device 301 as the transfer packet 501 of FIG. 5, while designating the virtual identifier of the controlling device 314 as the virtual identifier 502 of the transfer destination.

In each of the packets shown in FIGS. 1 and 2 which are transmitted when the transmission medium connecting device 301 transfers a packet, it is judged whether an actual node ID or a virtual identifier is contained as the ID of the transmission source, by using a value which is not currently used in the pri 107 of the header of the packet. When 0000 is designated as the pri 107, the ID of the transmission source is a node ID. When 0001 is designated as the pri, it indicates that a virtual identifier is contained.

Apart from the example described above, the case where the controlling device 314 reserves a bandwidth which is to be used in an isochronous packet of the controlled device 316 may be possible. In such a case, the controlling device 314 can transmit a packet for reserving a bandwidth with using the transfer packet shown in FIG. 5. In the case where virtual identifier No. 128 is predetermined to be the bandwidth management node of the second transmission medium 317, for example, the controlling device 314 uses No. 128 as a virtual identifier and transmits the transfer packet shown in FIG. 5 in which a packet containing a bandwidth allocation request is in the data portion, to the transmission medium connecting device 301. As a result, the controlling device 314 can perform allocation of the bandwidth of the second transmission medium 317, without knowing the node ID of the bandwidth management node of the second transmission medium 317. Therefore, the process for reserving a bandwidth of another bus can be simplified. During the bandwidth allocation, when the CSR address in the transmission medium information list 305 and corresponding to the bus to which the controlled device 316 is connected is read out, the controlling device 314 can know the delay 410 and the number 411 of nodes which are contained in the address. This enables the controlling device 314 to know information such as the degree of the propagation delay incident to transmission of an actual isochronous packet. Consequently, the bandwidth allocation can be performed correctly.

When the controlling device 314 transmits a packet to the controlled device 316 and it is expected that a write request packet or a read request packet is transmitted to the controlling device 314 as a result of the operation based on instructions contained in the packet, the controlling device 314 previously requests the packet transferring means 307 of the transmission medium connecting device 301 to transfer the packet. This request can be performed by designating the virtual identifier of the transmission node of the packet, either of writing or reading, and the range of addresses on which an operation of writing or reading is to be performed. In the case of a write request from the controlled device 316 to CSR address FFFFF0000B00 of the transmission medium connecting device 301, for example, the designation is conducted so that the packet is transferred to the controlling device 314.

In the case where a packet satisfying the conditions is received during when such a request is issued, the packet transferring means 307 of the transmission medium connecting device 301 transfers the write request packet, as not writing into the CSR space of the transmission medium connecting device 301 but a write request to the controlling device 314. In this case, since the controlling device 314 is a device knowing the presence of the transmission medium connecting device 301, the controlling device 314 uses the virtual identifier of the controlled device 316 as the ID of the transmission source of the write request packet. As a result, the controlling device 314 recognizes the received write request to be a request from the controlled device 316, and transmits-a packet containing a response to the write request to the transmission medium connecting device 301, as the transfer packet shown in FIG. 5. Even when the controlling device 314 is a device not knowing the presence of the transmission medium connecting device 301, therefore, a write request packet or a read request packet transmitted from the controlled device 316 can be transferred to the controlling device 314.

This request of transfer is, continued until the node performing the request cancels the request. When a bus reset occurs in a bus to which the node performing the request is connected and it is confirmed that the node performing the request is disconnected or in a non-operation state, the packet transferring means 307 cancels the transfer request. This configuration can cope with a situation where a node which has performed a request is disconnected from a bus or becomes inoperative without canceling the request. The operation of the node which has performed the request can be confirmed when the apparatus information collecting means 303 updates the apparatus information list 302. The request is canceled on the basis of deletion from the apparatus information list 302 or values of the state 403 indicating the operation state of the nodes in the table.

In the embodiment, the apparatus information collecting means 303, the information outputting means 304, the transmission medium information producing means 306, the packet transferring means 307, and the virtual identifier, applying means 308 which are connected to the internal bus 318 can be easily realized by software of a single microcomputer. Particularly, these means use information contained in a self ID packet. When these means are realized by a single microcomputer, therefore, the information can be efficiently processed. The apparatus information list 302, the transmission medium information list 305, and the virtual identifier correspondence table 309 can be realized by a single memory. In other words, when the means 302 to 309 are realized by a microcomputer and a memory, an efficient configuration can be achieved. Alternatively, a magnetic or optical storage medium on which programs for executing the above-described operations may be recorded and a microcomputer may be operated with using the medium. Also the alternative can attain the same effects as those described above.

(Second embodiment)

Figure 6:
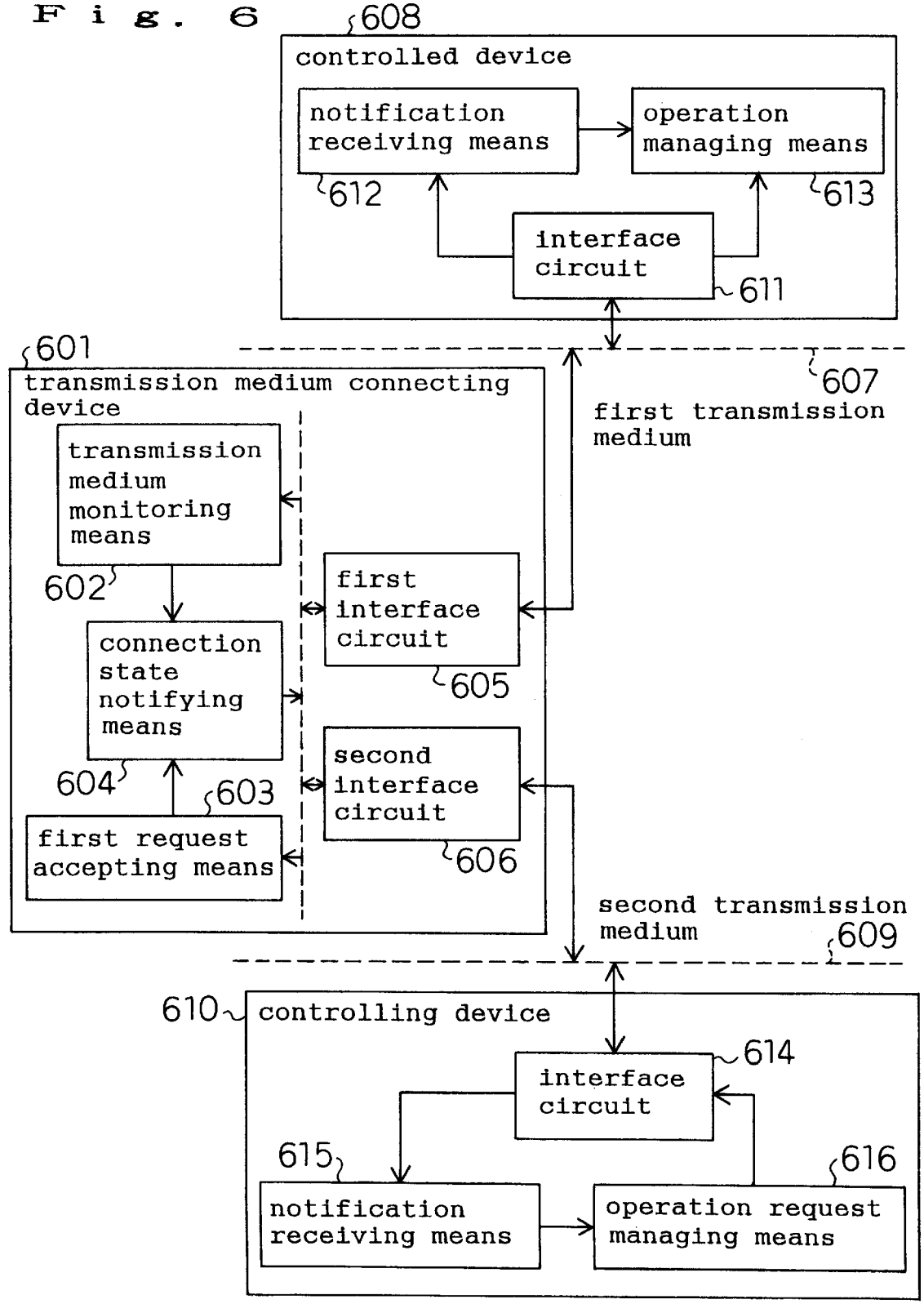
FIG. 6 is a schematic block diagram showing main portions of a transmission medium connecting device, a controlling device, and a controlled device in a second embodiment of the invention.

FIG. 6 is a block diagram showing the main configuration and connection state of a transmission medium connecting device, a controlled device, and a controlling device of the embodiment. In the embodiment, an IEEE 1394 interface is used as a transmission medium.

A transmission medium connecting device 601 which is connected to first and second transmission media 607 and 609 and which has a function of transferring a packet between the media comprises: transmission medium monitoring means 602; connection state notifying means 604; first request accepting means 603; a first interface circuit 605; and a second interface circuit 606. A controlled device 608 connected to the first transmission medium 607 consists of notification receiving means 612, operation managing means 613, and an interface circuit 611. A controlling device 610 connected to the second transmission medium 609 consists of notification receiving means 615, operation request managing means 616, and an interface circuit 614 The first and second interface circuits 605 and 606 of the transmission medium connecting device 601, the interface circuit 611 of the controlled device 608, and the interface circuit 614 of the controlling device 610 are circuits which attain the electrical matching with the corresponding connected transmission medium, and which perform transmission and reception of a packet and state detection.

Hereinafter, the case where the controlling device 610 controls the operation of the controlled device 608 will be described.

When the controlling device 610 is to control the operation of the controlled device 608, the operation request managing means 616 first identifies the virtual identifier of the controlled device 608 by the method described in the first embodiment. In response to this inquiry, the interface circuit 614 transmits or receives a packet on the basis of instructions of the operation request managing means 616.

After the virtual identifier of the controlled device 608 is identified, the operation request managing means 616 transmits a request for an exclusive use of an apparatus to the controlled device 608, via the transmission medium connecting device 601. The communication between the controlling device 610 and the controlled device 608 via the transmission medium connecting device 601 is performed by the method described in the first embodiment. For the sake of convenience in description, in the description of the packet transfer between the devices, the operation of the transmission medium connecting device 601 is not described, and only transmission and reception between the controlling device 610 and the controlled device 608 will be described.

On the other hand, the operation managing means 613 of the controlled device 608 which receives the exclusive use request stores information such as identification information of the controlling device 610, and returns a response indicating acceptance of the exclusive use. In the case where the exclusive use request cannot be accepted, such as that where the controlled device 608 has been already exclusively used by another apparatus, the means returns a response indicting denial of the exclusive use request. When the operation request managing means 616 of the controlling device 610 receives the response indicating acceptance of the exclusive use from the controlled device 608, the control of the controlled device 608 is enabled thereafter. By contrast, this causes the controlled device 608 to be exclusively used by the controlling device 610, and the controlled device denies an exclusive use request from another device.

The operation request managing means 616 of the controlling device 610 requests the first request accepting means 603 of the transmission medium connecting device 601 to, when a bus reset occurs in the first transmission medium 607, notify the occurrence to the controlling device 610, and also to, when a bus reset occurs in the second transmission medium 609, notify the occurrence to the controlled device 608. When such notification is requested, the operation request managing means 616 of the controlling device 610 checks the operation managing means 613 of the controlled device 608 to see whether the controlled device 608 comprises the notification receiving means 612 or not, i.e., whether the controlled device 608 receives the notification of the bus reset of the second transmission medium 609 and appropriate operations described later are enabled or not. When it is conformed as a result of the check that the controlled device 608 can receive the notification of the bus reset of the second transmission medium 609, it is requested to notify the occurrence of the bus reset of the second transmission medium 609 to the controlled device 608.

After such request of exclusive use and that of notification, the operation request managing means 616 of the controlling device 610 performs an operation request on the controlled device 608. The operation managing means 613 of the controlled device 608 which receives the operation request realizes the requested operation, and, if necessary, transmits a result and the like to the operation request managing means 616 of the controlling device 610.

In the case w here the controlled device 608 is an AV apparatus such as a digital VTR and the controlling device 610 is a controller of the AV apparatus, such an operation request corresponds to a request of an operation such as reproduction, or stop. The operation managing means 613 of a digital VTR or the controlled device 608 which receives a request of starting the reproduction from the operation request managing means 616 of a controller or the controlling device 610 performs a reproduction operation and then transmits a result indicative of the performing of reproduction to the operation request managing means 616. By contrast, in the case where the controlled device 608 is a hard disk drive using SBP2 and the controlling device 610 is a PC which controls the hard disk drive, an operation request corresponds to a request of reading or writing data. The operation managing means 613 of a hard disk drive or the controlled device 608 which receives a request of reading a specific region from the operation request managing means 616 of a PC or the controlling device 610 reads out the designated data from the hard disk and then transmits the read out data to the controlling device 610.

An IEEE 1394 interface which is used as the first and second transmission media 607 and 609 is an interface in which an apparatus can be connected or disconnected during operation of the interface. Therefore, there may be a case where, during such a control operation is performed, a new apparatus is additionally connected to the first transmission medium 607 or conversely an apparatus which has been connected is disconnected. There may a further case where the controlled device 608 itself is disconnected from the transmission medium 607. In such a case, a bus reset occurs in the first transmission medium 607. When, even after the bus reset, the controlled device 608 is kept to be connected to the first transmission medium 607 and operate, the controlled device 608 once cancels requests of an operation which has been performed and in the course of process, and exclusive use, and then again accepts an exclusive use request and an operation request. By contrast, when also a device which controls the controlled device 608 is connected to the same medium or the first transmission medium 607, the bus reset is detected and an exclusive use request and an operation request are again performed. This is conducted because there may be a case where the device which performs an operation request or an exclusive use request, or the controlled device 608 is disconnected from the transmission medium as a result of the bus reset. The exclusive use state is once canceled by a bus reset, and an exclusive use request is again performed after the bus reset is ended, whereby it is confirmed that both the devices operate.

Thereafter, a control operation is again performed. Also in SBP2 and a control method for an AV apparatus, therefore, it is specified that a controlled device should cancel request of exclusive use and an operation in the course of process, in response to a bus reset, and a controlling device should again perform an exclusive use request and an operation request.

On the other hand, the transmission medium monitoring means 602 of the transmission medium connecting device 601 monitors a bus reset of the connected first and second transmission media 607 and 609. When a bus reset such as the above-described bus reset in the first transmission medium 607 is detected, the means outputs a result of the detection. The connection state notifying means 604 which receives the detection result previously receives from the first request accepting means 603 instructions that, when a bus reset occurs in the first transmission medium 607, the notifying means should notify the occurrence to the controlling device 610. Therefore, the connection state notifying means 604 transmits a notification that a bus reset occurs in the first transmission medium 607, to the controlling device 610.

The notification receiving means 615 of the controlling device 610 which receives the notification that a bus reset occurs in the first transmission medium 607 notifies the operation request managing means 616 that operation and exclusive use requests of the controlled device 608 which are already performed are canceled as a result of the bus reset in the first transmission medium 607. The operation request managing means 616 which receives the notification again transmits an operation request after a request for exclusive use is performed, in the same manner as the case where the control is started.

As described above, the notification receiving means 615 of the controlling device 610 receives the notification from the connection state notifying means 604 of the transmission medium connecting device 601, whereby normal operation can be conducted even after the bus reset of the first transmission medium 607.

By contrast, there may be a case where a new apparatus is additionally connected to the second transmission medium 609 to which the controlling device 610 is connected or conversely an apparatus which has been connected or the controlling device 610 itself is disconnected. In such a case, a bus reset occurs in the second transmission medium 609. As described above, in response to the occurrence of a bus reset, the operation request managing means 616 again performs an exclusive use request and an operation request.

The bus reset is detected also by the transmission medium monitoring means 602 of the transmission medium connecting device 601. Since it is previously requested to notify an occurrence of a bus reset in the second transmission medium 609 to the controlled device 608, the connection state notifying means 604 notifies the bus reset in the second transmission medium 609 to the notification receiving means 612 of the controlled device 608. The notification receiving means 612 which receives the notification instructs the operation managing means 613 to cancel requests of exclusive use and operation which have been received. In other words, this corresponds to an operation which is identical with that performed in the case where a bus reset is detected in the first transmission medium 607 to which the controlled device 608 is connected.

As described above, the notification receiving means 612 of the controlled device 608 receives the notification from the connection state notifying means 604 of the transmission medium connecting device 601, whereby, when a bus reset occurs in the second transmission medium 609, requests of exclusive use and operation can be canceled. Even when the controlling device 610 is disconnected as a result of a bus reset occurring in the second transmission medium 609, normal operation can be thereafter continued.

When the request of notification in the case of the detection of initialization of a transmission medium is received, the first request accepting means 603 can store the identification of the device which performs the request, and can monitor the device. The first request accepting means 603 monitors the device which performs the notification request. When it is detected that the device is not operating because of a reason such as disconnection of the device from the transmission medium, the first request accepting means cancels the notification request. According to this configuration, it is possible to prevent notification from being performed even after the controlling device 610 is disconnected from the second transmission medium 609.

When notification in the case of the detection of initialization of a transmission medium is to be performed, the connection state notifying means 604 can perform the notification by using a parameter which is designated when the first request accepting means 603 receives the notification request. For example, a packet which is transmitted in the case of the detection of initialization of a transmission medium may be received as a parameter, and the notification may be performed by transmitting the packet. In this way, the controlling device 610 can designate a packet which is to be used in notification, whereby a method of notification can be selected in accordance with the controlled device 608.

(Third embodiment)

Figure 7:
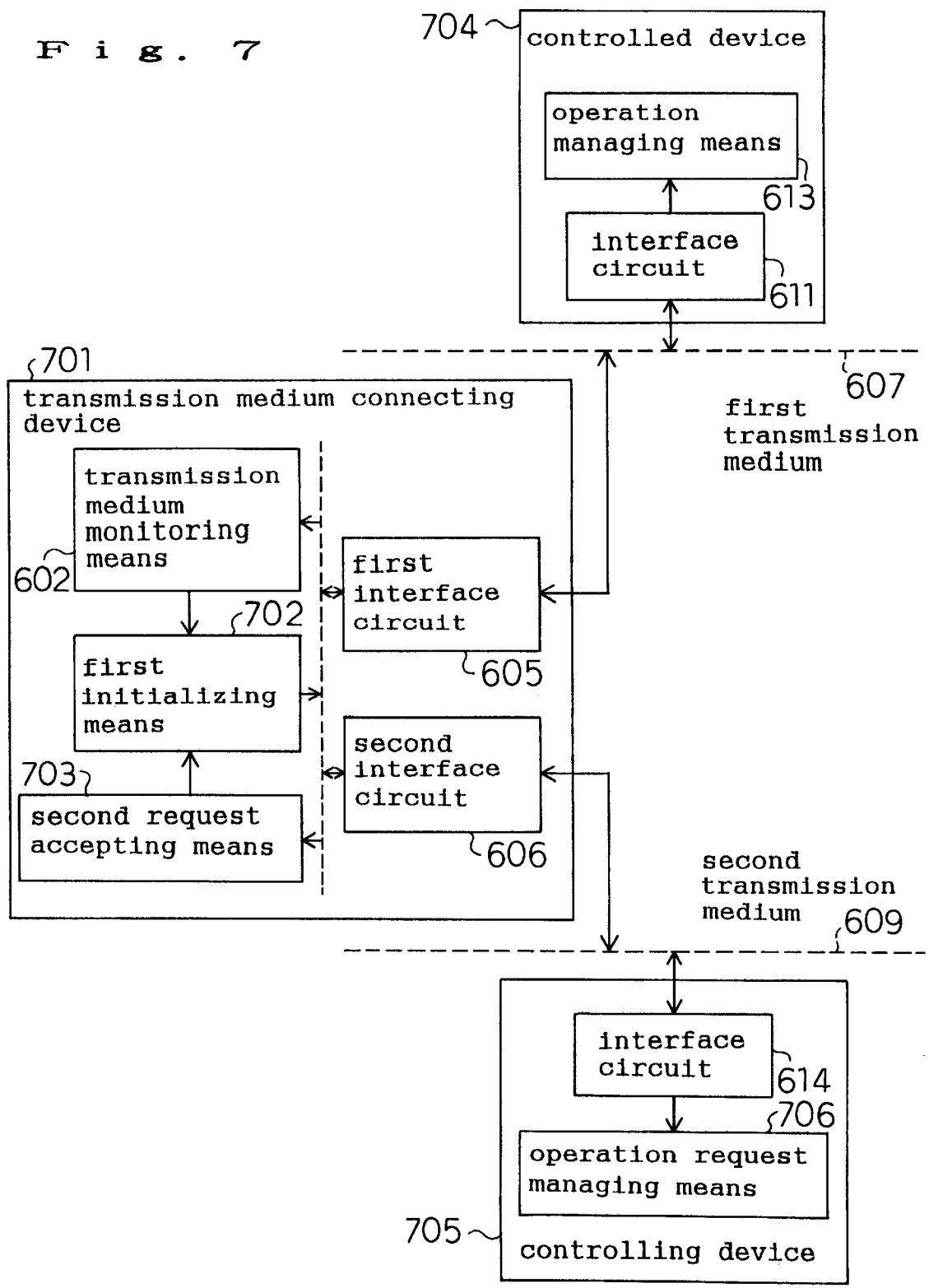
FIG. 7 is a schematic block diagram showing main portions of a transmission medium connecting device, a controlling device, and a controlled device in a third embodiment of the invention.

FIG. 7 is a block diagram showing the main configuration and connection state of a transmission medium connecting device, a controlled device, and a controlling device of the embodiment. In the embodiment also, in the same manner as the second embodiment, an IEEE 1394 interface is used as a transmission medium. The components identical with those of the second embodiment are designated by the same reference numeral.

A transmission medium connecting device 701 which is connected to first and second transmission media 607 and 609 and which has a function of transferring a packet between the media comprises: transmission medium monitoring means 602; first initializing means 702; second request accepting means 703; a first interface circuit 605; and a second interface circuit 606. A controlled device 704 connected to the first transmission medium 607 consists of operation managing means 613, and an interface circuit 611. A controlling device 705 connected to the second transmission medium 609 consists of operation request managing means 706, and an interface circuit 614.

Hereinafter, the case where the controlling device 705 controls the operation of the controlled device 704 will be described. The operation request managing means 706 of the controlling device 705 identifies the virtual identifier of the controlled device 704, and requests an exclusive use of the controlled device 704 in the same manner as the second embodiment. Also an operation request which is to be performed after the exclusive use request is performed in the same manner as the second embodiment. Similar to the description of the second embodiment, with respect to communication between the controlling device 705 and the controlled device 704, the operation of the transmission medium connecting device 701 is not particularly described, and only transmission and reception between the controlling device 705 and the controlled device 704 will be described.

In advance of transmission of an operation request, the operation request managing means 706 of the controlling device 705 transmits to the second request accepting means 703 of the transmission medium connecting device 701, a request of, when a bus reset occurs in the first transmission medium 607, causing a bus reset to occur in the second transmission medium 609. Together with the request, also a request of, when a bus reset occurs in the second transmission medium 609, causing a bus reset to occur in the first transmission medium 607 is transmitted.

When a bus reset occurs in the first transmission medium 607, the operation managing means 613 of the controlled device 704 cancels an exclusive use request which has been received and an operation request which is in the course of process, in the same manner as the second embodiment. When the transmission medium monitoring means 602 of the transmission medium connecting device 701 detects a bus reset in the first transmission medium 607, the means outputs a result of the detection. By contrast, the first initializing means 702 previously receives instructions of, when a bus reset occurs in the first transmission medium 607, causing a bus reset to occur in the second transmission medium 609. When the first initializing means receives the detection result of a bus reset in the first transmission medium 607, therefore, the first initializing means causes a bus reset to occur in the second transmission medium 609. The occurrence of a bus reset in the second transmission medium 609 enables the operation request managing means 706 of the controlling device 705 to again perform an exclusive use request and an operation request of the controlled device 704.

By contrast, when the first initializing means 702 receives the detection result of a bus reset in the second transmission medium 609 from the transmission medium monitoring means 602, the first initializing means causes a bus reset to occur in the first transmission medium 607. The occurrence of a bus reset in the second transmission medium 609 enables the operation request managing means 706 of the controlling device 705 to again perform an exclusive use request and an operation request. The operation managing means 613 of the controlled device 704 detects the bus reset in the first transmission medium 607 and cancels requests such as an exclusive use request, and an operation request which has not yet been processed.

As described above, when a bus reset occurs in one of transmission media to which the controlling device 705 and the controlled device 704 are connected, the first initializing means 702 causes a bus reset to occur in the other transmission medium, whereby the detection of a bus reset can be always performed by both the controlling device 705 and the controlled device 704. According to this configuration, an exclusive use request and an operation request can be appropriately canceled and again requested. In other words, according to this configuration, even after a bus reset occurs in any one of transmission media, normal operation can be thereafter continued. By generating a bus reset, the controlling device 705 is caused to repeat the procedure of exclusive use and retransmit an operation request, and the controlled device 704 is caused to cancel requests of exclusive use and operation. Therefore, the controlling device 705 and the controlled device 704 are not required to be designed for the use in a situation where plural transmission media are connected.

In the embodiment also, in the same manner as the second embodiment, the second request accepting means 703 monitors the device which performs a request of causing a bus reset. When it is detected that the device is not operating, the second request accepting means can cancel the request of causing a bus reset, so as to prevent thereafter a unnecessary bus reset from occurring.

(Fourth embodiment)

Figure 8:
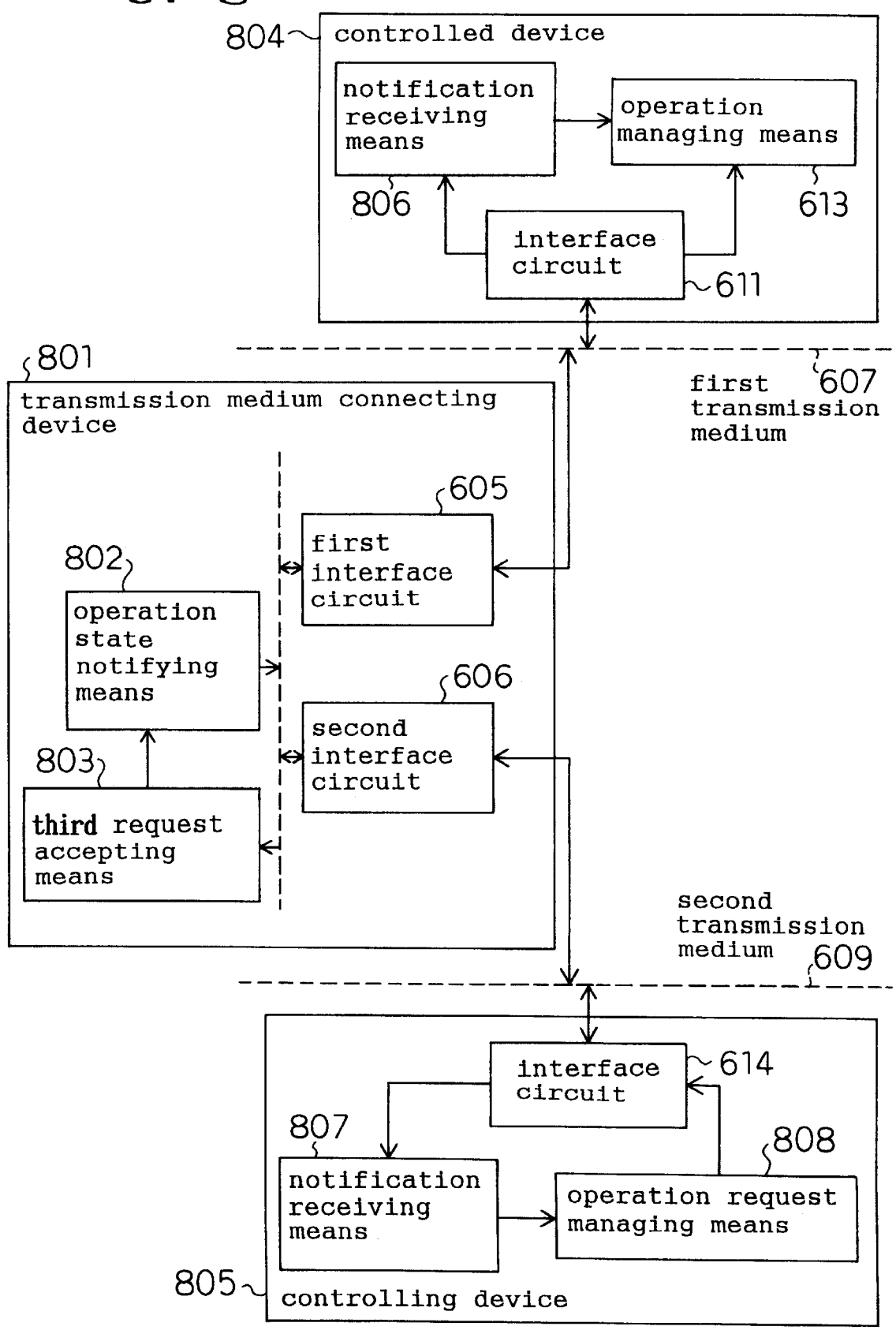
FIG. 8 is a schematic block diagram showing main portions of a transmission medium connecting device, a controlling device, and a controlled device in a fourth embodiment of the invention.

FIG. 8 is a block diagram showing the main configuration and connection state of a transmission medium connecting device, a controlled device, and a controlling device of the embodiment. In the embodiment also, in the same manner as the second and third embodiments, an IEEE 1394 interface is used as a transmission medium. The components identical with those of the second and third embodiments are designated by the same reference numeral.

A transmission medium connecting device 801 which are connected to first and second transmission media 607 and 609 and which has a function of transferring a packet between the media comprises: operation state notifying means 802; third request accepting means 803; a first interface circuit 605; and a second interface circuit 606. A controlled device 804 connected to the first transmission medium 607 consists of notification receiving means 806, operation managing means 613, and an interface circuit 611. A controlling device 805 connected to the second transmission medium 609 consists of notification receiving means 807, operation request managing means 808, and an interface circuit 614.

Hereinafter, the case where the controlling device 805 controls the operation of the controlled device 804 will be described. The operation request managing means 808 of the controlling device 805 identifies the virtual identifier of the controlled device 804, and requests an exclusive use of the controlled device 804 in the same manner as the second embodiment. Also an operation request which is to be performed after the exclusive use request is performed in the same manner as the second embodiment. Only transmission and reception between the controlling device 805 and the controlled device 804 will be described.

In advance of transmission of an operation request, the operation request managing means 808 of the controlling device 805 transmits to the third request accepting means 803 of the transmission medium connecting device 801, a request of, when it is detected that the controlling device 805 is not operating because of a reason such as disconnection of the device from the transmission medium 609, notifying the detection to the controlled device 804. Furthermore, the operation request managing means 808 issues a request of, when it is detected that the controlled device 804 is not operating, notifying the detection to the controlling device 805. The operation state notifying means 802 of the transmission medium connecting device 801 receives a request which has been received by the third request accepting means 803 and monitors the operation state of the device which is designated by the request. The monitoring of the operation state of the device can be performed by checking the operation states of all nodes connected to a transmission medium in which a bus reset occurs, and the identification number specific to an apparatus. In other words, this can be performed during updation of the apparatus information list in the first embodiment. The operation state notifying means 802 previously stores the identification number of the device the operation state of which is monitored, and can confirm whether the designated device is operating or not, by checking whether a node of the identification number is connected even after a bus reset or not.

When it is detected as a result of such a confirmation operation that the controlled device 804 is not operating because of a reason such as disconnection of the device from the first transmission medium 607, the operation state notifying means 802 notifies the detection to the notification receiving means 807 of the controlling device 805. The notification receiving means 807 of the controlling device 705 which receives the notification outputs the notification to the operation request managing means 808. The operation request managing means 808 stops an operation request which is currently performed, and the like. According to this configuration, it is possible to thereafter prevent an operation request from being transmitted to the controlled device 804 which is not operating.

By contrast, when it is detected that the controlling device 805 is not operating because of a reason such as disconnection of the device from the-second transmission medium 609, the operation state notifying means 802 notifies the detection to the notification receiving means 806 of the controlled device 804. The notification receiving means 806 which receives the notification outputs instructions of canceling requests of exclusive use and operation which have been received from the controlling device 805, to the operation managing means 613. The operation managing means 613 cancels the exclusive use state and an operation request which is in the course of process. As a result, an exclusive use request or an operation request from another device can be thereafter received, and normal operation can be continued.

After the above-mentioned notification is performed, i.e., the operation of the device which is monitored by the operation state notifying means 802 is stopped and the notification is made to the designated device, the third request accepting means 803 of the transmission medium connecting device 801 cancels the notification request.

Also in the embodiment, in the same manner as the second embodiment, notification using a parameter which is received together with the notification request can be performed.

(Fifth embodiment)

Figure 9:
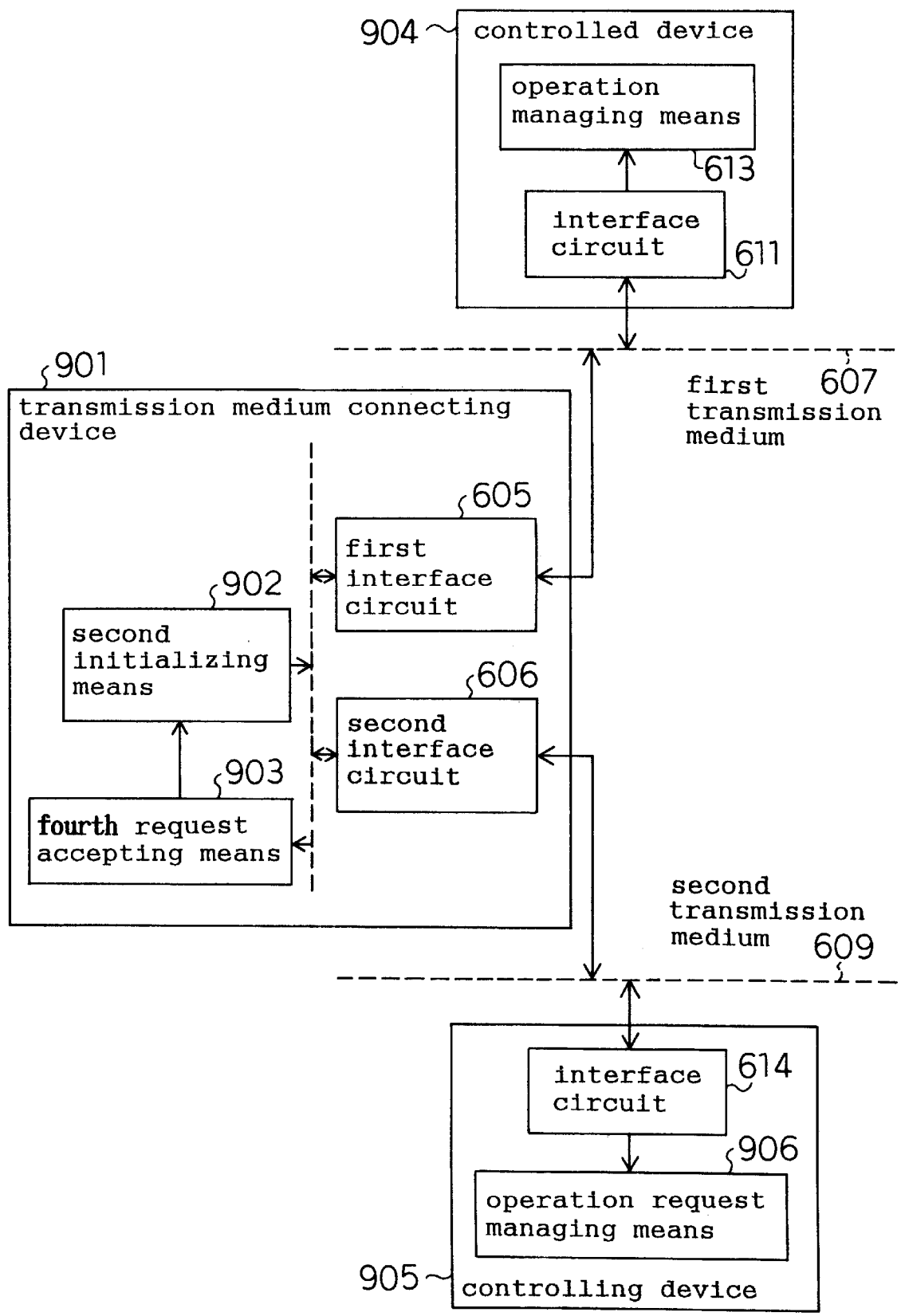
FIG. 9 is a schematic block diagram showing main portions of a transmission medium connecting device, a controlling device, and a controlled device in a fifth embodiment of the invention.

FIG. 9 is a block diagram showing the main configuration and connection state of a transmission medium connecting device, a controlled device, and a controlling device of the embodiment. In the embodiment also, in the same manner as the second to fourth embodiments, an IEEE 1394 interface is used as a transmission medium. The components identical with those of the second to fourth embodiments are designated by the same reference numeral.

A transmission medium connecting device 901 which are connected to first and second transmission media 607 and 609 and which has a function of transferring a packet between the media comprises: second initializing means 902; fourth request accepting means 903; a first interface circuit 605; and a second interface circuit 606. A controlled device 904 connected to the first transmission medium 607 consists of operation managing means 613, and an interface circuit 611. A controlling device 905 connected to the second transmission medium 609 consists of operation request managing means 906, and an interface circuit 614.

Hereinafter, the case where the controlling device 905 controls the operation of the controlled device 904 will be described. The operation request managing means 906 of the controlling device 905 identifies the node ID of the controlled device 904, and requests an exclusive use of the controlled device 904 in the same manner as the second embodiment. Also an operation request which is to be performed after the exclusive use request is performed in the same manner as the second embodiment. Only transmission and reception between the controlling device 905 and the controlled device 904 will be described.

In advance of transmission of an operation request, the operation request managing means 906 of the controlling device 905 transmits to the fourth request accepting means 903 of the transmission medium connecting device 901, a packet for, when it is detected that the controlled device 904 is not operating because of a reason such as disconnection of the device from the first transmission medium 607, requesting the generation of a bus reset in the second transmission medium 609. Furthermore, the operation request managing means transmits also a packet for, when it is detected that the controlling device 905 is not operating, requesting the generation of a bus reset in the first transmission medium 607.

When it is detected that the controlled device 904 is not operating because of a reason such as disconnection of the device from the first transmission medium 607, the second initializing means 902 causes a bus reset to occur in the second transmission medium. In the same manner as the fourth embodiment, the confirmation that the controlled device 904 is not operating can be performed during updation of the apparatus information list in the first embodiment. In response to the bus reset, the operation request managing means 906 of the controlling device 905 conducts an operation of again specifying the virtual identifier of the controlled device 904. As a result, it is confirmed that the controlled device 904 is not operating, and an operation request is not thereafter performed. According to this configuration, it is possible to thereafter prevent an operation request from being transmitted to the controlled device 904 which is not operating.

By contrast, when it is detected that the controlling device 905 is not operating because of a reason such as disconnection of the device from the second transmission medium 609, the second initializing means 902 causes a bus reset to occur in the first transmission medium. In response to the bus reset, the operation managing means 613 of the controlled device 904 cancels an exclusive use request which has been received and an operation request which is in the course of process. As a result, an exclusive use request or an operation request from another device can be thereafter received, and normal operation can be continued.

After a bus reset is generated as described above, i.e., the operation of the device which is monitored by the operation state notifying means 902 is stopped and a bus reset is generated in the designated transmission medium, the fourth request accepting means 903 of the transmission medium connecting device 901 cancels the notification request.

The means of the second to fifth embodiments except the interface circuits may be realized also by a CPU and a software which executes the operations of the means of the respective embodiments. A magnetic or optical storage medium on which programs for executing the above-described operations may be recorded and a CPU may be operated with using the medium. Also this configuration can attain the same effects as those described above.

As described above, when the transmission medium connecting device, the controlling device, and the controlled device of the invention are used, a packet can be normally transmitted and received under a situation where plural transmission media in which identification information is changed during operation, such as IEEE 1394 are used. In transmission and reception of control information, even when a control which requires an exclusive use is performed, a normal operation can be continued without being affected by disconnection of an apparatus, or the like. Regarding inquiries about information relating to apparatuses, an operation can be performed more efficiently than the case of a combination of prior art methods, and the fear of disturbing another communication can be reduced.

What is claimed is:

1. A transmission medium connecting device through which plural bus type transmission media in which an apparatus identifier applied to a connected apparatus is changed are connected to one another and packets are exchanged, wherein said device comprises:

virtual identifier applying means for applying a virtual identifier to each of apparatuses, said virtual identifier being able to identify all apparatuses connected to said bus type transmission media;

a virtual identifier correspondence table which holds correspondence between said virtual identifiers of said apparatuses and said apparatus identifiers;

packet transmitting means for transmitting a packet to said bus type transmission media; and packet receiving means for receiving a packet from said bus type transmission media, when said packet receiving means receives a transfer packet in which said virtual identifier is used as a destination parameter and which requests a transfer to another apparatus, said transmission medium connecting device converts said destination parameter into said apparatus identifier of a destination at this timing, on the basis of said virtual identifier correspondence table, and said packet transmitting means transmits contents of said transfer packet to an apparatus indicated by said destination parameter, with using said apparatus identifier.

2. A transmission medium connecting device according to claim 1, wherein, when said packet receiving means receives a response packet which can be judged to be a response to said transfer packet, said packet transferring means transfers said response packet to an apparatus which has transmitted said transfer packet.

3. A transmission medium connecting device according to claim 1, wherein a data portion contained in said transfer packet has a same format as a packet transmitted by said packet transferring means, and said data portion contains a data which is required in transmission performed by said packet transmitting means.

4. A transmission medium connecting device according to claim 1, wherein, when said apparatus identifier is changed, said virtual identifier applying means updates said virtual identifier correspondence table.

5. A transmission medium connecting device according to claim 4, wherein, in updation of said virtual identifier correspondence table in response to a change of said apparatus identifier, said virtual identifier applying means applies said virtual identifier so as to correspond to a same apparatus before the updation.

6. A transmission medium connecting device according to claim 1, wherein said virtual identifier applying means applies a specified virtual identifier to an apparatus which provides a function of managing said bus type transmission media.

7. A transmission medium connecting device according to claim 1, wherein, when transmission media in which plural transmission speeds can be selectively used are used as said bus type transmission media and a transmission speed of a packet is designated by a parameter contained in said transfer packet, said packet transmitting means performs a packet transmission at the designated speed.

8. A transmission medium connecting device according to claim 1, wherein, when transmission media in which plural transmission speeds can be selectively used are used as said bus type transmission media, said packet transmitting means performs a packet transmission with using a maximum transmission speed which is available with respect to an apparatus of a transmission destination.

9. A transmission medium connecting device according to claim 1, wherein said packet transmitting means uses a virtual identifier of an apparatus which requests a transfer of said transfer packet, as an apparatus identifier (108) of a source of transmission of said transfer packet.

10. A transmission medium connecting device according to claim 1, wherein said transfer packet contains transmission apparatus designation information which designates a use of either of an apparatus identifier of said transmission medium connecting device and a virtual identifier of an apparatus which requests a transfer of said transfer packet, as an identifier of a source of transmission in the case where said packet transmitting means transmits said transfer packet, and said packet transmitting means transmits a packet with applying the identifier of a source of transmission on the basis of said transmission apparatus designation information.

11. A transmission medium connecting device through which plural bus type transmission media are connected to one another and packets are exchanged, said connecting device comprising:

packet receiving means of receiving a transmit packet from a controlled device;

packet transferring means of accepting a transferring request which contains predesignated conditions, of a packet to be transferred and predesignation of the transfer destination, from a controlling device via one of said transmission media;

wherein said packet transferring means, when the transmit packet received by said packet receiving means from the controlled device satisfies the conditions predesignated by the controlling device, transfers said transmit packet to the destination which is predesignated by the controlling device, via transmission media; and said packet transferring means monitors said transmission media, and when said packet transferring means confirms that the controlling device is not operating, said packet transferring means cancels said transferring request from said controlling device.

12. A transmission medium connecting device according to claim 11, wherein said packet transferring means uses a part of or all parameters contained in a packet, as conditions of a packet to be transferred.

13. A transmission medium connecting device through which plural bus type transmission media in which an apparatus can be connected or disconnected during operation and which, when a connection state is changed, are initialized are connected to one another, wherein said device comprises:

transmission medium monitoring means for monitoring a state of each of said transmission media connected to said transmission medium connecting device, and for detecting initialization of said transmission media;

first request accepting means for accepting designation information relating to a monitored transmission medium which is to be monitored with respect to initialization, and a connection state notification destination device to which notification of occurrence of initialization of said monitored transmission medium, from a first requesting device which is connected to one of said transmission media connected to said transmission medium connecting device; and connection state notifying means for, when said transmission medium monitoring means detects initialization of a transmission medium which is a monitoring object, notifying the detection to said connection state notification destination device.

14. A transmission medium connecting device according to claim 13, wherein said first request accepting means monitors an operation state of said first requesting device and, when it is detected that said first requesting device is not operating, cancels designation of said monitored transmission medium and said connection state notification destination device which has been performed by said first requesting device.

15. A transmission medium connecting device according to claim 13, wherein said connection state notifying means notifies initialization of said monitored transmission medium to said connection state notification destination device with using a parameter which is designated by said first requesting device together with said monitored transmission medium and said connection state notification destination device.

16. A transmission medium connecting device through which plural bus type transmission media in which an apparatus can be connected or disconnected during operation and which, when a connection state is changed, are initialized are connected to one another, wherein said device comprises:

transmission medium monitoring means for monitoring a state of each of said transmission media connected to said transmission medium connecting device, and for detecting initialization of said transmission media;

second request accepting means for accepting designation of a monitored transmission medium which is to be monitored with respect to initialization, and an initialized transmission medium which is to be interlockingly initialized, from a second requesting device which is connected to one of said transmission media connected to said transmission medium connecting device; and first initializing means for, when said transmission medium monitoring means detects initialization of said monitored transmission medium, initializing said initialized transmission medium in a manner interlocked with the initialization.

17. A transmission medium connecting device according to claim 16, wherein said second request accepting means monitors an operation state of said second requesting device, and, when it is detected that said second requesting device is not operating, cancels designation of said monitored transmission medium and said initialized transmission medium which has been performed by said second requesting device.

18. A transmission medium connecting device through which plural bus type transmission media in which an apparatus can be connected or disconnected during operation and which, when a connection state is changed, are initialized and connected to one another, wherein said device comprises:

request accepting means of accepting a designation of a monitored device which is connected to one of said transmission media connected to said transmission medium connecting device, and which is to be monitored with respect to an operation state, and an operation state notification destination device to which a non-operation state of said monitored device is notified, from a requesting device which is connected to one of said transmission media connected to said transmission medium connecting device; and operation state notifying means of monitoring the operation state of said monitored device, and, when it is detected that said monitored device is not operating, notifying a non-operation state to said operation state notification destination device.

19. A transmission medium connecting device according to claim 18, wherein, when said operation state notifying means performs notification to said operation state notification destination device, said request accepting means cancels designation of said monitored device and said operation state notification destination device which has been performed by said requesting device.

20. A transmission medium connecting device according to claims 18, wherein said operation state notifying means notifies a non-operation state of said monitored transmission medium to said operation state notification destination device, using a parameter which is designated by said requesting device together with said monitored transmission medium and said operation state notification destination device.

21. A transmission medium connecting device through which plural bus type transmission media in which an apparatus can be connected or disconnected during operation and which, when a connection state is changed, are initialized and connected to one another, said device comprises:

request accepting means of accepting designation of a monitored device which is to be monitored with respect to an operation state, and an initialized transmission medium which is to be initialized, from a requesting device which is connected to one of said transmission media connected to said transmission medium connecting device; and initialing means of monitoring the operation state of said monitored device, and for, when it is detected that said monitored device is not operating, initializing said initialized transmission medium.

22. A transmission medium connecting device according to claim 21, wherein, when said initializing means initializes said initialized transmission medium, said request accepting means cancels designation of said monitored device and said initialized transmission medium which has been performed by said requesting device.

23. A controlled device which is connected to a first transmission medium in which an apparatus can be connected or disconnected during operation and which, when a connection state is changed, is initialized, wherein said controlled device operates with receiving an operation request from a controlling device connected to a second transmission medium, said controlled device being indirectly connected to said second transmission medium via a transmission medium connecting device connected to a first transmission medium to which said controlled device is directly connected, said controlled device comprises:

notification receiving means of receiving at least one of a notification indicating that initialization occurs in said second transmission medium and a notification indicating that said controlling device is not operating; and operation managing means of managing an operation of said controlled device, and, when said notification receiving means receives one of the notifications, canceling a part of or all of the operation request, and said controlled device operates with receiving the operation request from said controlling device.

24. A controlled device according to claim 23, wherein, in response to an inquiry whether said controlled device comprises said notification receiving means or not, said operation managing means performs a response indicting that said controlled device comprises said notification receiving means.

25. A controlling device which is connected to a transmission medium in which an apparatus can be connected or disconnected during operation and which, when a connection state is changed, is initialized, wherein said controlling device transmits an operation request to a controlled device, said controlled device being indirectly connected to a first transmission medium via a transmission medium connecting device connected to a second transmission medium to which said controlling device is directly connected, and said controlling device comprises:

notification receiving means for receiving at least one of a notification indicating that initialization occurs in said first transmission medium, and a notification indicating that said controlled device is not operating; and operation request managing means for generating and transmitting the operation request to said controlled device, for, when said notification receiving means receives one of the notifications, checking an operation state of said controlled device, and for, when said controlled device is operating, again transmitting an operation request which has not yet been completed.

26. A transmission medium connecting device according to claim 12, wherein said bus type transmission medium is a serial bus compliant with IEEE 1394, and an address of a CSR address space defined in IEEE 1394 is used as the parameter which is used as the conditions of a packet to be transferred and contained in a packet.

27. A transmission medium connecting device according to claim 1, wherein said transmission medium is a serial bus compliant with IEEE 1394.

28. A transmission medium connecting device according to claim 13, wherein said transmission medium is a serial bus compliant with IEEE 1394.

29. A transmission medium connecting device according to claim 16, wherein said transmission medium is a serial bus compliant with IEEE 1394.

30. A transmission medium connecting device according to claim 18, wherein said transmission medium is a serial bus compliant with IEEE 1394.

31. A transmission medium connecting device according to claim 21, wherein said transmission medium is a serial bus compliant with IEEE 1394.

32. In a communications network having a plurality of busses, wherein a first device communicates on a first bus, a second device communicates on a second bus, and a connecting device communicates between the first bus and the second bus, a method of communicating between the first device and the second device comprising the steps of:

(a) storing in the connecting device, a node identification (ID) for each of the first and second devices;

(b) storing in a corresponding table in the connecting device, a virtual ID for each of the node IDs stored in step (a);

(c) accessing by the first device the table in the connecting device and obtaining a virtual ID of the second device;
(d) transmitting from the first device to the connecting device a packet of data and the virtual ID of the second device;
(e) exchanging in the connecting device the virtual ID transmitted, in step (d) with the node ID for the second device; and
(f) transmitting from the connecting device to the second device data which are included in the packet transmitted in step (d) by using the node ID as a destination;

whereby the second device receives the data included in the packet transmitted from the first device.

33. In a communications network having a plurality of busses, wherein a first device communicates on a first bus, a second device communicates on a second bus, and a connecting device communicates between the first bus and the second bus, and each device has a respective node ID,
a method of communicating between the first device and the second device comprising the steps of:
(a) accessing and obtaining by the first device from the connecting device a virtual ID of the second device;
(b) transmitting from the first device to the connecting device a packet of data and the virtual ID of the second device;
(c) exchanging in the connecting device the virtual ID transmitted in step (b) with a node ID for the second device; and
(d) transmitting from the connecting device to the second device data which are included in the packet transmitted in step (b);

whereby the second device receives the data included in the packet transmitted from the first device.

34. The method of claim 32 further including the steps of:
(g) receiving in the connecting device a response packet from the second device;
(h) judging in the connecting device that the response packet is a response to the packet transmitted in step (d); and
(i) transmitting the response packet from the connecting device to the first device.

35. A transmission medium connecting device according to claim 11, wherein said transfer destination is said controlling device.

* * * * *